United States Patent [19]

Azuma et al.

[11] Patent Number: 4,999,530
[45] Date of Patent: Mar. 12, 1991

[54] LINEAR PULSE MOTOR WITH MAGNETIC ARMATURE LOCK

[75] Inventors: Hiroshi Azuma; Kenji Takemura; Kohji Itoh, all of Tsukuba, Japan

[73] Assignee: Omron Corporation, Kyoto, Japan

[21] Appl. No.: 399,944

[22] Filed: Aug. 29, 1989

[30] Foreign Application Priority Data

Aug. 30, 1988 [JP] Japan .................... 63-113998[U]
Aug. 30, 1988 [JP] Japan .................... 63-215788

[51] Int. Cl.$^5$ .................. H02K 7/106; G11B 21/22
[52] U.S. Cl. ............................... 310/12; 310/77; 360/105
[58] Field of Search ............... 188/161, 171; 310/77, 310/12, 105, 256; 360/105

[56] References Cited

U.S. PATENT DOCUMENTS 4,594,627 6/1986 Viskochil et al. .................. 360/105
4,686,595 8/1987 Bryer .................................. 360/105

Primary Examiner—Peter S. Wong
Assistant Examiner—D. L. Rebsch
Attorney, Agent, or Firm—Fish & Richardson

[57] ABSTRACT

In a planar linear pulse motor, the relative movement between the stator and the armature is positively restricted when no electric current is supplied to the drive coils by means of a lock member provided on either the armature or the stator. This lock member is attracted to a permanent magnet by its biasing magentic flux so as to be brought into contact with whichever of the armature or stator does not have the lock member on it. As a result, the armature may be locked up without consuming any electric power. If the lock member is attached to the stator or armature by means of an elastic member, the vertical dimension of the member attaching the lock member to the stator or armature can be reduced. Furthermore, the mechanical strength and the security of the engagement of the lock member to the stator or armature can be increased. As a result, the planar linear pulse motor disclosed is compact and highly reliable. In those cases when the lock member is mounted on the stator, there is no increase in the moving mass of the motor, resulting in no impairment of the rate of response of the pulse motor.

12 Claims, 19 Drawing Sheets

FIG. 4A
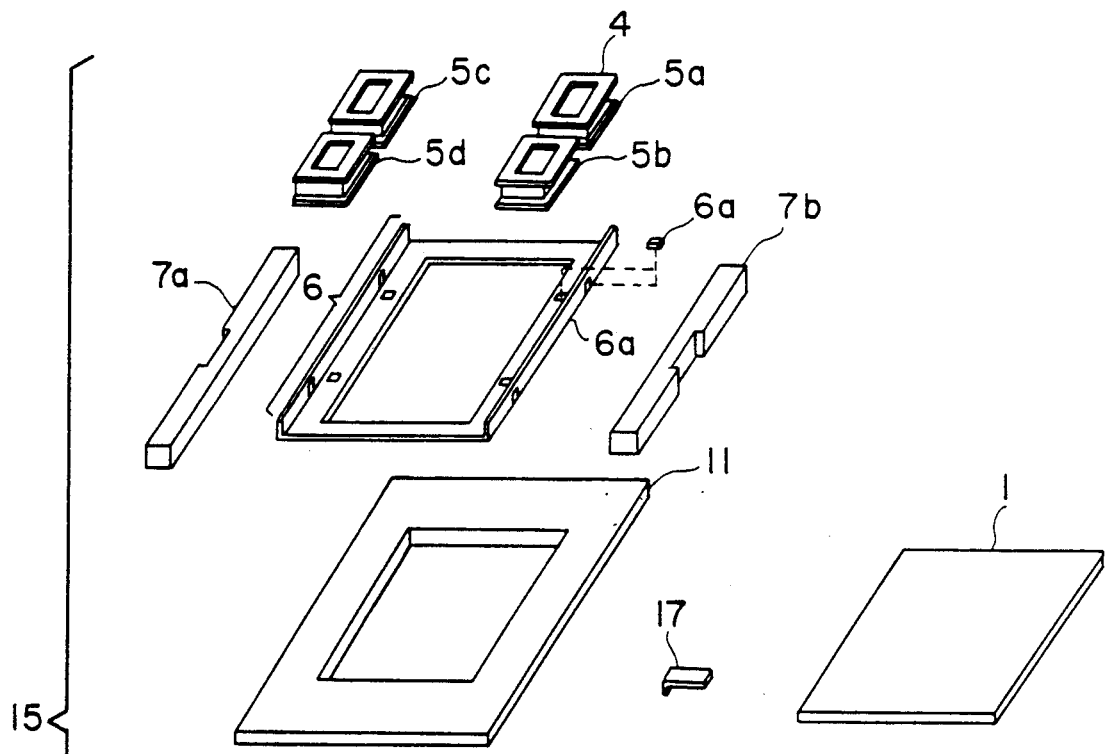
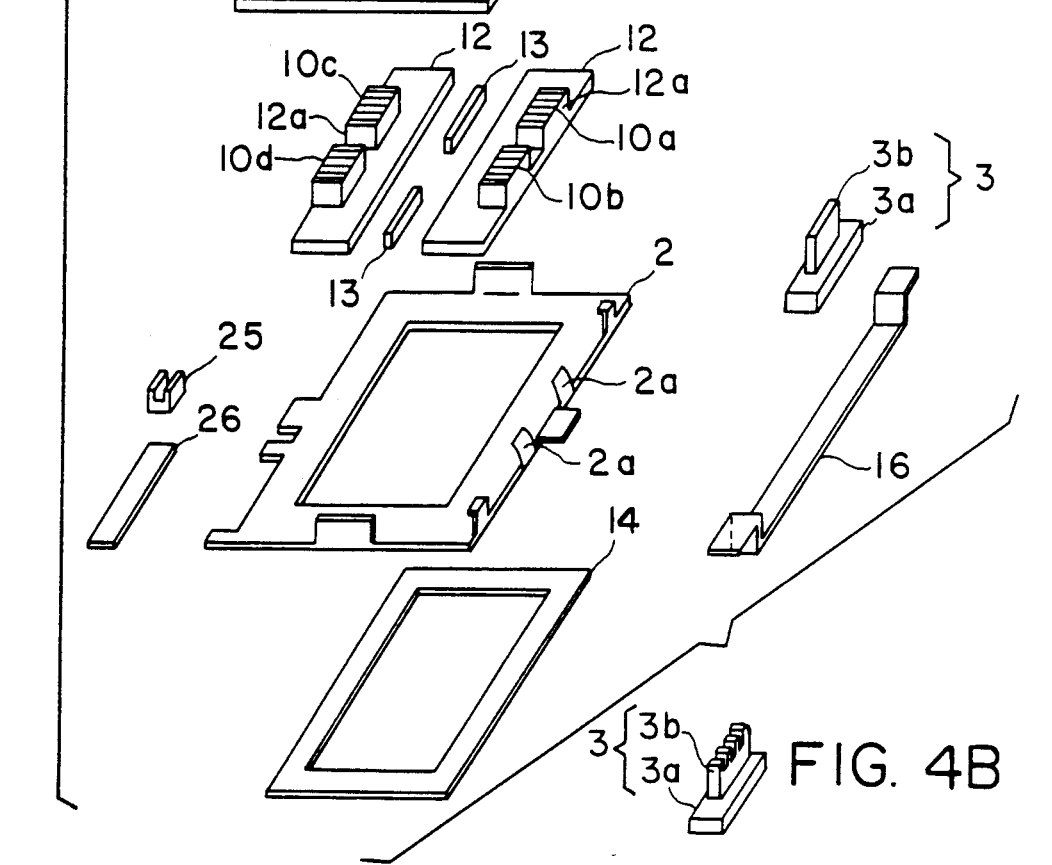
FIG. 4B

LINEAR PULSE MOTOR WITH MAGNETIC ARMATURE LOCK

TECHNICAL FIELD

The present invention relates to linear pulse motors, and in particular to planar linear pulse motors for such applications as the magnetic head drives of floppy disk drives for personal computers and word processors.

BACKGROUND OF THE INVENTION

A conventional planar linear pulse motor typically has a stator and an armature carrying mutually opposing magnetic pole teeth and is controlled so that some of the magnetic pole teeth of the stator may oppose the corresponding magnetic pole teeth of the armature. By appropriately energizing the drive coils provided in the magnetic pole teeth of the stator in a prescribed order, the opposing pairs of the magnetic pole teeth are made to shift in such a manner that the armature is moved by one fourth of the pitch of the magnetic pole teeth by each shifting of the energized state of the drive coils. To prevent inadvertent movement of the armature when the drive coils are not energized, a permanent magnet may be provided to produce a biasing magnetic flux in such a manner that a closed-loop magnetic flux may be produced across the magnetic pole teeth of the stator and the armature (refer to Japanese patent laid-open publication No. 62-64252). In other words, in such a linear pulse motor, when the drive coils are not energized, the armature is kept stationary and fixedly engaged by the force (which is called a cogging force) acting between the magnetic pole teeth of the stator and the armature which are magnetized by the biasing magnetic flux produced from the permanent magnet.

However, since this cogging force is not very strong, the armature could move and its stationary position could change when impacts, vibrations or other external forces were applied to the armature. Therefore, there was a possibility when such a planar linear pulse motor was used for the head drive of a floppy disk drive that its head would move abruptly, thereby causing not only faulty operation of the (read/write) head, but also damage to the linear pulse motor or to the head.

On the other hand, in order to more securely hold the armature, a large electric current must be supplied to some of the drive coils to increase their attractive forces, but this leads to an increase in power consumption.

BRIEF SUMMARY OF THE INVENTION

A primary object of the present invention is therefore to provide a planar linear pulse motor which can positively engage an armature at an arbitrary position with a simple structure and without consuming much electric power.

A second object of the present invention is to provide a planar linear pulse motor which can positively engage an armature at an arbitrary position without impairing the response property of the motor during normal operation.

A third object of the present invention is to provide a planar linear pulse motor which can positively engage an armature at an arbitrary position without increasing the thickness (or vertical dimension) of the motor.

These and other objects of the present invention can be accomplished by providing a planar linear pulse motor, comprising: which includes a stator having a yoke provided with magnetic pole pieces defining a plurality of magnetic pole teeth; an armature having a plurality of magnetic pole teeth opposing the magnetic pole teeth of the stator and slidably supported by the stator; a plurality of drive coils provided in the associated magnetic pole pieces of the stator yoke so as to be sequentially energized to produce a magnetic flux for moving the armature relative to the stator; a permanent magnet provided in the stator to form a closed loop of a biasing magnetic flux passing through the magnetic pole teeth of the stator and the magnetic pole teeth of the armature; and a lock member consisting of a magnetic member supported by the armature or the stator by way of a spring or elastic member to urge the lock member against the other of the armature or the stator; the permanent magnet being disposed in a part of the stator in such a manner that the biasing magnetic flux produced from the permanent magnet urges the lock member toward the other of the armature or the stator, against the biasing force of the spring member in order to restrict the movement of the armature relative to the stator when the drive coils are not energized, and releases the lock member away from the other of the armature or the stator under the biasing force of the spring member to permit movement of the armature relative to the stator when the drive coils are energized with a part of a magnetic flux produced from the drive coils canceling in the lock member the biasing magnetic flux produced from the permanent magnet.

In the planar linear pulse motor of the present invention, a lock member consisting of a magnetic member is supported by or the armature and the stator, and this lock member applies a pressure to the other of the armature or the stator by means of an attractive force produced by the permanent magnet when the drive coils are not energized. This pressure prevents relative movement between the armature and the stator. Since this attractive force is produced by the permanent magnet, no electric power is consumed. When the motor is activated and electric current is supplied to the drive coils, the resulting magnetic flux passes through the lock member and cancels the magnetic flux which was the cause of the attractive force, so that the attractive force is lost and the armature can move freely relative to the stator. The motor otherwise operates in the same way as a conventional planar linear pulse motor in that the drive coils are sequentially energized to move the armature by the increment of P/4, where P is the pitch of the magnetic pole teeth.

According to a preferred embodiment of the present invention the lock member is supported by the stator by way of the spring member so that the moving mass attached to the armature may be minimized, and the response property of the motor may not be impaired.

According to a structurally advantageous embodiment of the present invention, the permanent magnet is disposed adjacent to the yoke thus defining an opening between the permanent magnet and the yoke, and the lock member is disposed adjacent an end of the opening remote from the armature, the lock member being provided with a projection which extends through the opening so as to come into contact with a part of the armature when the lock member is actuated by the biasing magnetic flux of the permanent magnet. This acts to minimize the overall vertical dimension of the motor. Alternatively, the armature is provided with a frictional rail element extending along the direction of movement of the armature and comprising a depending portion depending from the armature and a lateral extension extending laterally from a lower end of the depending portion, and the lock member is disposed above the lateral extension so as to be pressed upon the lateral extension when actuated by the biasing magnetic flux of the permanent magnet. A similar result can be achieved if the lock member is provided with a lateral arm which is adapted to engage with the armature when the lock member is actuated by the biasing magnetic flux of the permanent magnet.

To achieve a secure and stable engagement between the armature and the stator, the spring member should consist of a sheet spring carrying the lock member in a central part thereof and fixedly secured to the stator at two ends thereof.

If the lock member is supported by the armature by way of the spring member, the moving mass of the armature may be increased but the overall height of the motor may be reduced.

Alternatively, the lock member may consist of a magnetic member supported on the stator by way of a sheet spring member, the spring member comprising a central part carrying the lock member, a pair of intermediate parts on either side of the central part supported by parts of the stator in the manner of fulcrums, and free ends extending beyond the intermediate parts and carrying frictional members. In this case, the pressure applied to the armature may be amplified by the lever action of the sheet spring member.

BRIEF DESCRIPTION OF THE DRAWINGS

Now the present invention is described in the following in terms of specific embodiments with reference to the appended drawings, in which:

FIG. 4(A) is an exploded perspective view of a stator of the first embodiment;

FIG. 4(B) is a view of an alternate embodiment of the lock member;

DETAILED DESCRIPTION OF THE PREFERRED EMBODIMENTS

FIGS. 1 through 8 are drawings illustrating a first embodiment of the planar linear pulse motor according to the present invention.

Figure 1:
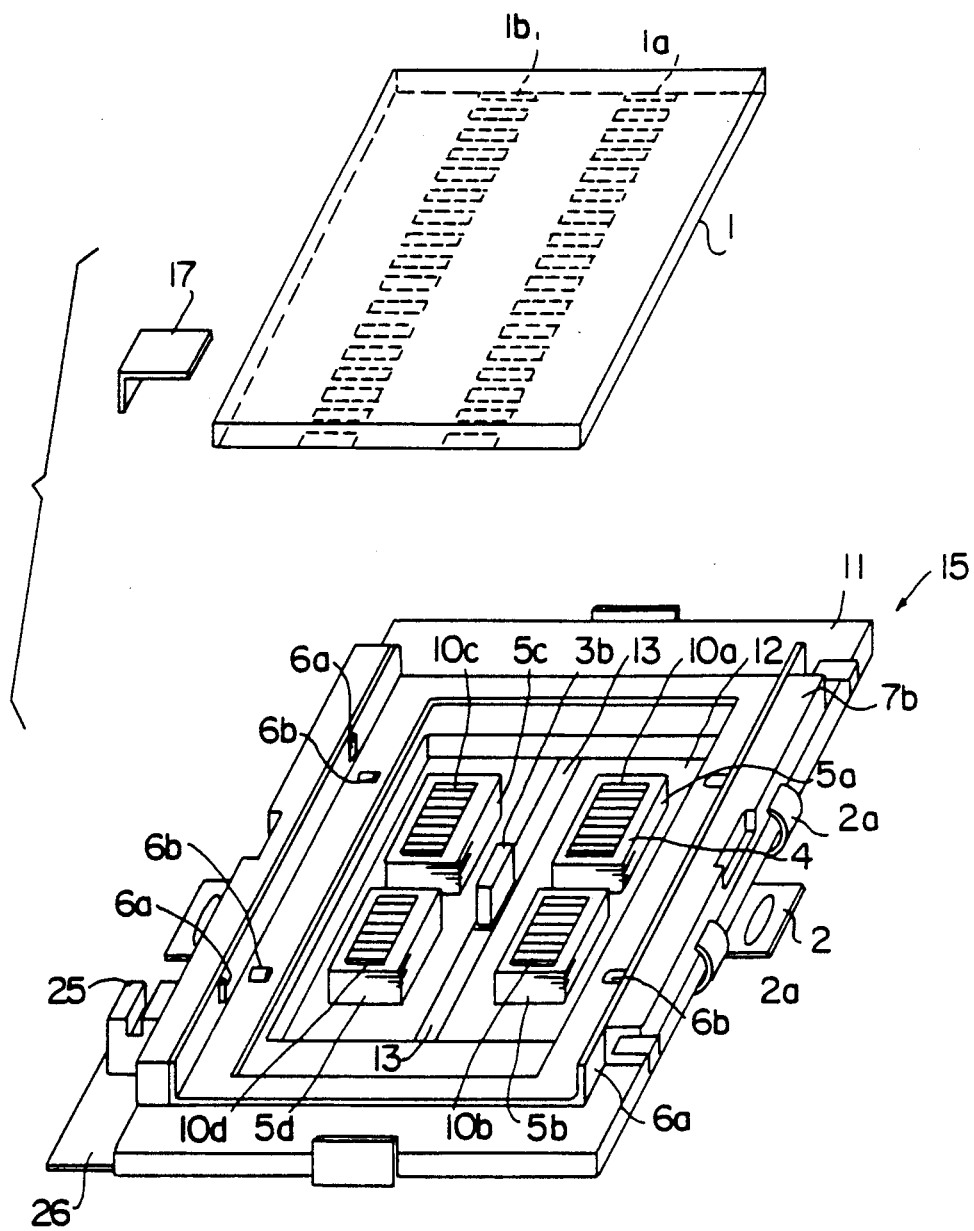
FIG. 1 is an a partially exploded perspective view of a first embodiment of the planar linear pulse motor according to the present invention.
Figure 2:
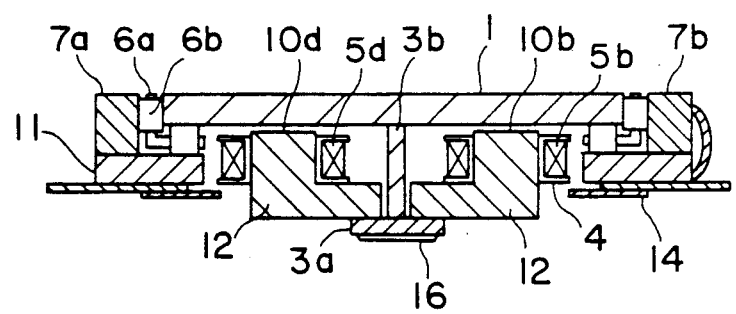
FIG. 2 is a sectional view taken along a plane perpendicular to the direction of the movement of the armature.
Figure 3:
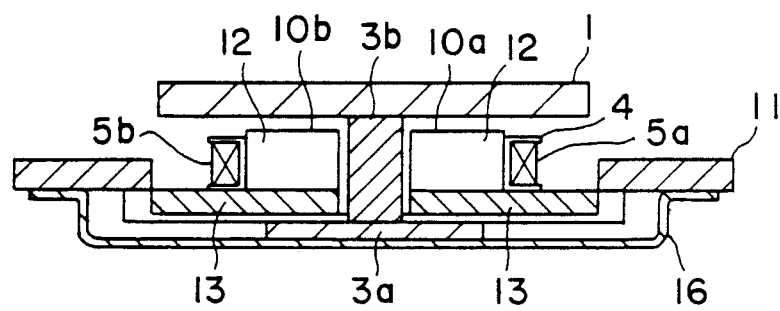
FIG. 3 is a sectional view taken along a plane parallel to the direction of the movement of the armature.
Figure 5:
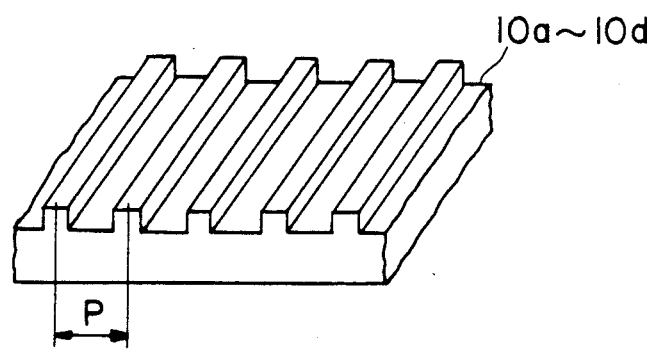
FIG. 5 is an enlarged perspective view of the magnetic pole teeth.

FIGS. 1 through 5 illustrates its structure: FIG. 1 is a perspective view of the planar linear pulse motor showing its armature in a detached state; FIGS. 2 and 3 are cross sectional views of the planar linear pulse motor in its assembled state; FIG. 4 is an exploded perspective view of the planar linear pulse motor; and FIG. 5 is a perspective view of stator of the planar magnetic pole teeth.

The stator 15 has a base 11. A central part of the base 11 is provided with a rectangular opening 11a. The two side portions of the upper surface of the base 11 serve as roller guide surfaces (rail surfaces). The rectangular central opening 11a receives a pair of yokes 12 made of magnetic material and a pair of permanent magnets 13. The prismatic permanent magnets 13 are interposed between the laterally arranged pair of yokes 12 and the yokes 12 are integrally attached not only to one another but also to the front and rear fringes of the lower surface of the base 11 adjoining the rectangular opening 11a. Gaps are defined between the yokes 12 and the lateral ends of the rectangular opening 11a. Each of the yokes 12 is provided with a pair of coil cores 12a integrally projecting therefrom, and magnetic pole teeth 10a, 10b, 10c and 10d are formed on the upper surfaces of the coil cores 12a either by etching or by machining. The permanent magnets 13 are each provided with N and S poles on their side surfaces adjoining the yokes 12.

The magnetic pole teeth 10a through 10d are formed as ridges and grooves of rectangular cross-section which alternate at a fixed pitch P as shown in FIG. 5 in enlarged scale. As described hereinafter, they are called as magnetic pole teeth because the rectangular ridges serve as N or S poles. It is also possible to use magnetic pole teeth made of permanent magnets. The magnetic pole teeth 10a and 10c are arranged at equal pitch and in the same phase relationship, and the same is true with the magnetic pole teeth 10b and 10d. The magnetic pole teeth 10a and 10b are arranged at the same pitch but at a phase relationship which is shifted by P/2. The four coil cores 12a or the magnetic pole teeth 10a through 10d are provided with drive coils 5a, 5b, 5c and 5d wound around spools 4 fitted thereon.

To the lower surface of the base 11 is secured a pre-pressure spring frame 2 which is substantially conformal (annular frame) to the base 11 and is provided with various tab pieces along its periphery. The pre-pressure spring frame 2 serves both as a motor mount and a member for preventing the armature 1 from coming off. To the lower surface of the pre-pressure spring frame 2 is fixedly secured a circuit board 14 for the drive coils 5a through 5d. To the upper surface of a side end of the pre-pressure spring frame 2 are fixedly secured a sensor 25 for detecting the reference position of the motor and a circuit board 26 for this sensor.

To one side of the base 11 is fixedly secured a travel reference guide 7a by screws or with a bonding agent. The inner side surface of this guide 7a defines an exact right angle with respect to the direction in which the rectangular ridges (grooves) of the magnetic pole teeth 10a through 10d extend. On the other side of the base 11 is disposed a pre-pressure guide 7b in a slightly laterally moveable manner. The pre-pressure springs 2a provided as tabs extending from the peripheral edges of the pre-pressure spring frame 2 urge the pre-pressure guide 7b inwardly.

A travel support mechanism 6 for the armature 1 is provided between the guide 7a and the pre-pressure guide 7b, and this mechanism comprises a retainer 6a. This retainer 6a is rectangular in shape and is provided with vertical portions on either side end thereof, as well as a rectangular central opening conformal to the base 11. The side fringes and the vertical portions of the retainer 6a are provided with a plurality of small openings for rotatably receiving roller pins 6b therein.

The armature 1 consists of a planar magnetic member, and its lower surface is provided with two rows of magnetic pole teeth 1a and 1b. The magnetic pole teeth 1a and 1b also consist of a plurality of alternating ridges and grooves of rectangular cross-section, and their pitch and phase relationship are the same as those of the magnetic pole teeth 10a through 10d. The magnetic pole teeth 1a and 1b are provided with a relative phase shift of P/4. A light shield 17 is attached to a side end of the upper surface of the armature 1 to detect the position of the armature 1 by shielding light from the sensor 25 for detecting the reference position of the motor. This armature 1 is received in the retainer 6a, and is supported by the roller pins 6b in a freely slidable manner. The vertical roller pins 6a contact the side surfaces of the armature 1 and the guides 7a and 7b, while the horizontal roller pins 6b are interposed between the lower surface of the armature 1 and the upper surface of the base 11 and are in contact with them. The magnetic pole teeth 1a of the armature 1 oppose the magnetic pole teeth 10a and 10b, and the magnetic pole teeth 1b oppose the magnetic pole teeth 10c and 10d, defining a predetermined gap therebetween in each case.

The lock member 3 consists of a base portion 3a consisting of magnetic material and a projection 3b projecting upwardly from a central part of the base portion 3a. The projection 3b may consist of non-magnetic material. This lock member 3 is fixedly secured to a central part of the upper surface of a sheet spring 16 which is secured to front and rear end portions of the base 11. As described hereinafter, the lock member 3 is attracted by the permanent magnet against the elastic force of the sheet spring 16, and the base portion 3a is thereby brought into contact with the reverse surface of the yokes 12.

As shown in FIG. 4(B), the free end of the lock member 3 and the associated lower surface portion of the armature 1 may be provided with irregular surfaces so as to achieve secure engagement therebetween.

Figure 6:
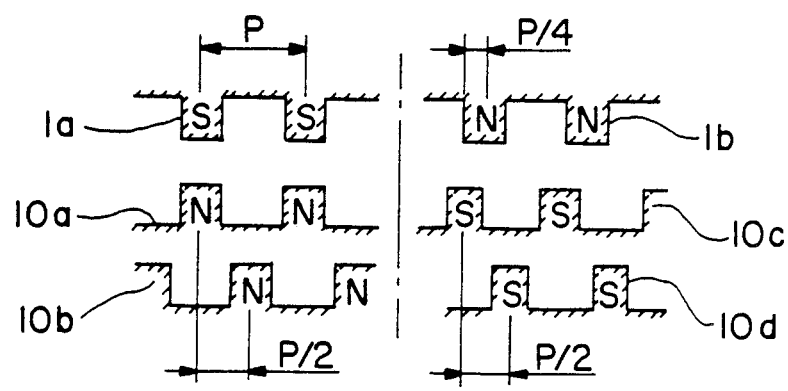
FIG. 6 is a schematic side view of the magnetic pole piece for explaining the working principle of the linear pulse motor.

The operation of the planar linear pulse motor described above is now described in the following with reference to FIG. 6. FIG. 6 shows the positional relationship between the magnetic pole teeth 1a and 1b of the armature 1 and the magnetic pole teeth 10a through 10d of the stator 15. The drive principle of this planar linear pulse motor is based on the unipolar drive method. The biasing magnetic flux produced from the permanent magnet 13 acts upon the magnetic pole teeth 1a, 1b, and 10a through 10d, and the rectangular ridges thereof are magnetized as illustrated in FIG. 6.

When the magnetic pole teeth 10a and 1a are shifted by P/4 from each other, electric current is supplied to the drive coil 5a corresponding to the magnetic pole teeth 10a so that a magnetic flux of the same direction as the biasing magnetic flux is produced in the magnetic pole teeth 10a. This produces a strong attractive force between the magnetic pole teeth 10a and the magnetic pole teeth 1a of the armature 1, and the armature 1 is moved by P/4 or until it reaches a stable state in which the rectangular ridges (of different polarities) of the magnetic pole teeth 10a and 1a squarely oppose each other. This state is illustrated in FIG. 6. By this time, the magnetic pole teeth 1b, and 10c and 10d have shifted by P/4 from each other.

Then the supply of electric current to the drive coil 5a is terminated, and electric current is supplied to the drive coil 5c so as to produce a magnetic flux in the magnetic pole teeth 10c which is directed in the same direction as the biasing magnetic flux produced from the permanent magnet 13. A strong attractive force acts between the magnetic pole teeth 10c and the armature 1, and the armature 1 is moved until the magnetic pole teeth 1b and 10b oppose each other and a stable state is reached. Likewise, by conducting electric current to the drive coils 5b and 5d in that order, the armature is moved by P/4 each time.

When electric current is supplied to none of the drive coils, the stator 1 reaches a stable position (for instance the position illustrated in FIG. 6) and is retained at this position by the attractive force acting between the magnetic pole teeth 1a, 1b and 10a through 10d and the permanent magnet 13. The force acting on the armature is the cogging force.

Figure 7:
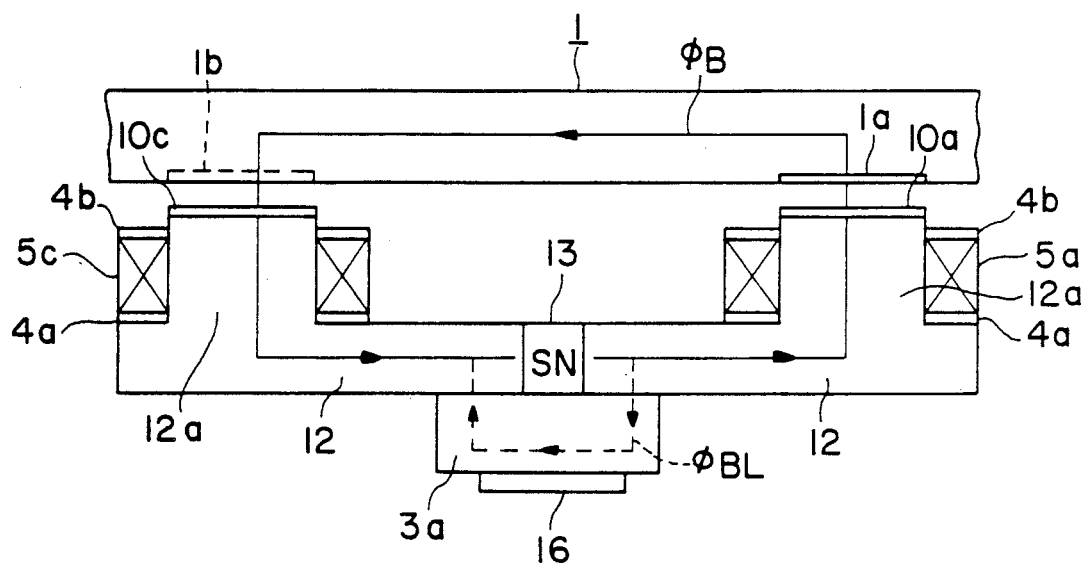
FIGS. 7 and 8 are schematic side views of the first embodiment for explaining a basic principle of the present invention.
Figure 8:
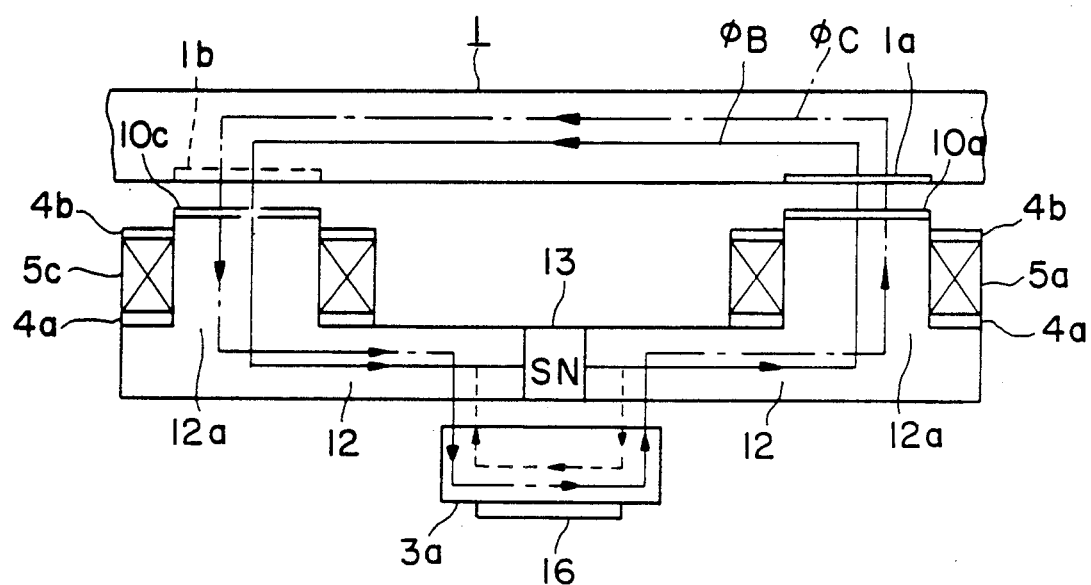

Now the locking action of the lock member 3 is described. FIG. 7 shows the state in which the armature 1 is locked up, and FIG. 8 shows the state in which the armature 1 is moved as described above. These drawings are enlarged views of a part of FIG. 2, but are given as views of a different cross-section from that of FIG. 2. In other words, for convenience of description, the drive coils 5a and 5c are illustrated instead of the drive coils 5b and 5d, and the magnetic pole teeth 10a and 10c are illustrated instead of the magnetic pole teeth 10c and 10d. Further, only the base portion 3a of the lock member 3 is illustrated, and the projection 3b is omitted from the drawings. In the following disclosure, the term "lock member" means the base portion 3a.

In FIG. 7, when electric current is supplied to none of the drive coils 5a through 5d, the biasing magnetic flux $\Phi_B$ of the permanent magnet 13 forms a closed loop passing through the yoke 12, the magnetic pole teeth 10a and 10b, the magnetic pole teeth 1a, the armature 1, the magnetic pole teeth 1b, the magnetic pole teeth 10c and 10d, and finally the yoke 12 again. This induces magnetic poles in the magnetic pole teeth and, hence, the cogging force. A leak magnetic flux $\Phi_{BL}$ of the biasing magnetic flux $\Phi_B$ passes through the lock member 3a, and attracts the lock member 3a toward the parts of the yokes 12 located on either side of the permanent magnet 13 against the restoring force of the sheet spring 16 so as to apply pressure to the armature 1 through the projection 3b. Since the pressure of the projection 3b is produced in addition to the cogging force, the armature 1 is very securely engaged. As there is no electric current involved, the armature may be fixedly engaged without consuming any electric power.

Now is described how the armature 1 is moved with reference to FIG. 8. When electric current is supplied to the drive coil 5a to produce a magnetic flux $\Phi_C$ directed in the same direction as the biasing magnetic flux $\Phi_B$ in the main magnetic circuit of the motor, this magnetic flux passes through the magnetic pole teeth 10a, the magnetic pole teeth 1a, the armature 1, the magnetic pole teeth 1b, the magnetic pole teeth 10c, the yoke 12, the lock member 3a, and the yoke 12. Since this magnetic flux in the lock member 3a is opposite in direction to the leak magnetic flux $\Phi_{BL}$ produced from the permanent magnet 13, the attractive force acting on the lock member 3a is sufficiently weakened for the lock member 3a to be moved away from the yoke 12 under the restoring force of the sheet spring 16, and the locking action is removed. The movement of the armature resulting from P/4 by supplying electric current to the drive coil 5a occurs in the way described above.

This action takes place in the same way when electric current is supplied to the drive coils 5b, 5c and 5d.

The locking action can be removed even when the projection 3b is not completely moved away from the yoke 12 as long as the attractive force acting between the lock member 3a and the yoke 12 is weakened. For instance, by appropriately selecting the restoring force of the sheet spring 16, it is possible to move the armature 1 even while the projection 3b is still in contact with the yoke 12. In this case, if a suitable amount of frictional resistance is applied to the armature, the distance required for the armature 1 to travel before coming to a complete stop can be reduced.

Figure 9:
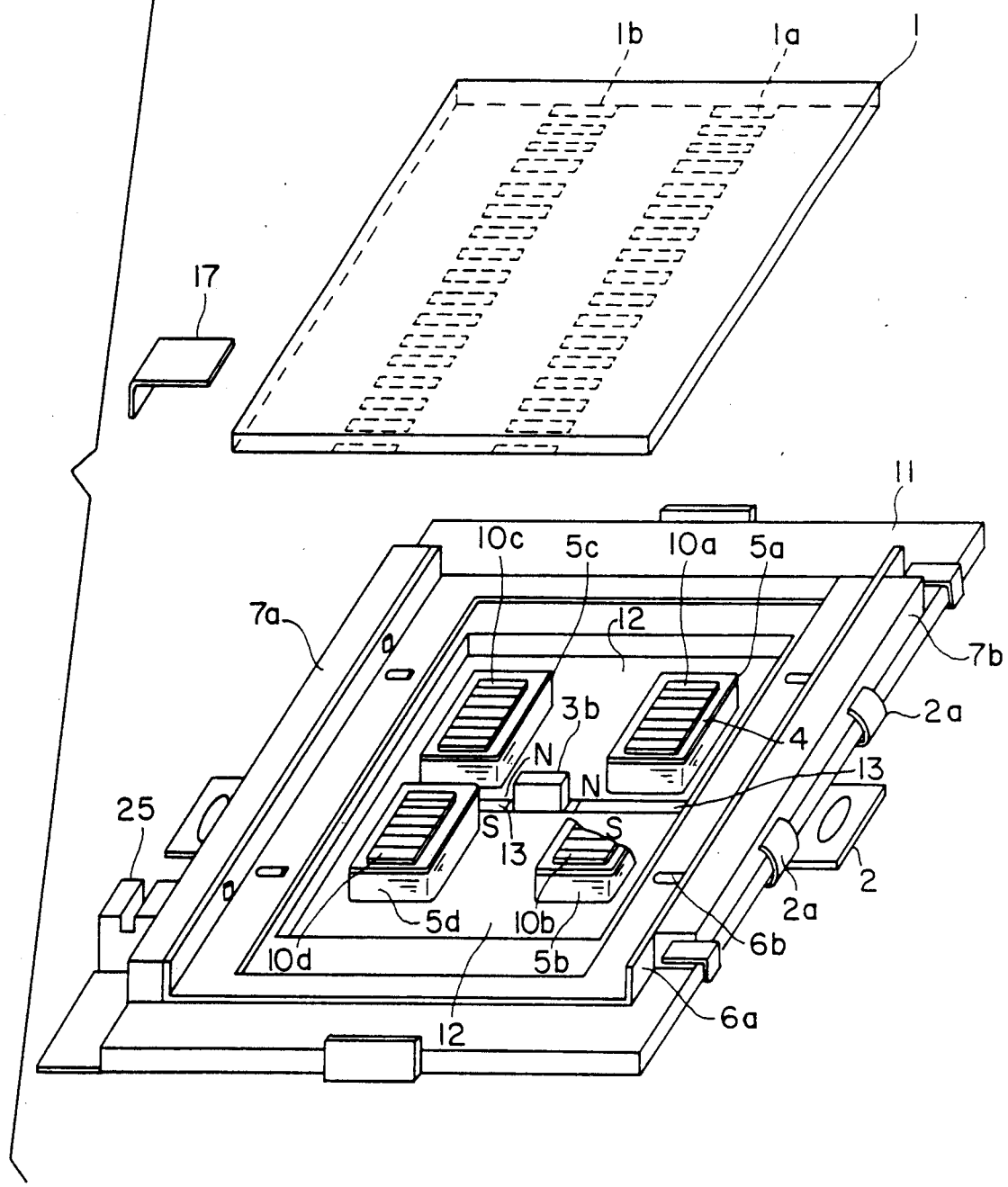
FIG. 9 is a perspective view of a second embodiment of the planar linear pulse motor according to the present invention partly broken away and partly given as an exploded view.

FIG. 9 shows a second embodiment of the planar linear pulse motor according to the present invention. The permanent magnet 13 of the first embodiment extends in the direction of the movement of the armature 1 and the N and S poles thereof are located laterally with respect to the direction of the movement of the armature 1 in the first embodiment, but this second embodiment makes use of a pair of permanent magnets 13 extending perpendicularly to the direction of the movement of the armature 1 so as to define the N and S poles along the direction of the movement of the armature 1 and an opening between the two permanent magnets 13. The yokes 12 are disposed to the front and rear of the permanent magnets 13. The biasing magnetic flux of the permanent magnets 13 passes through the yoke 12, the magnetic pole teeth 10 and 10c, the magnetic pole teeth 1a and 1b of the armature, the magnetic pole teeth 10b and 10d, and the yoke 12, in the same direction as the movement of the armature 1.

According to this linear pulse motor, the lock member 3a is elongated in the direction perpendicular to the direction of the movement of the armature 1, and achieves its locking action by being attracted to the yokes 12. A spring not shown in the drawing is fixedly secured to the lower surface of a pre-pressure spring frame 2. Its action of locking and releasing the armature 1 is the same as that of the first embodiment.

This linear pulse motor operates in the same way as the first embodiment, and the phase relationship of the magnetic pole teeth are determined as summarized in the following:

| armature phase | magnetic pole teeth 1a–1b | same |
|---|---|---|
| stator | magnetic pole teeth 10a–10c | P/2 |
| | magnetic pole teeth 10a–10b | +P/4 |
| | magnetic pole teeth 10a–10d | −P/2 |

Energization of the drive coils is conducted in the order of the coils 5a, 5b, 5c and 5d.

Figure 10:
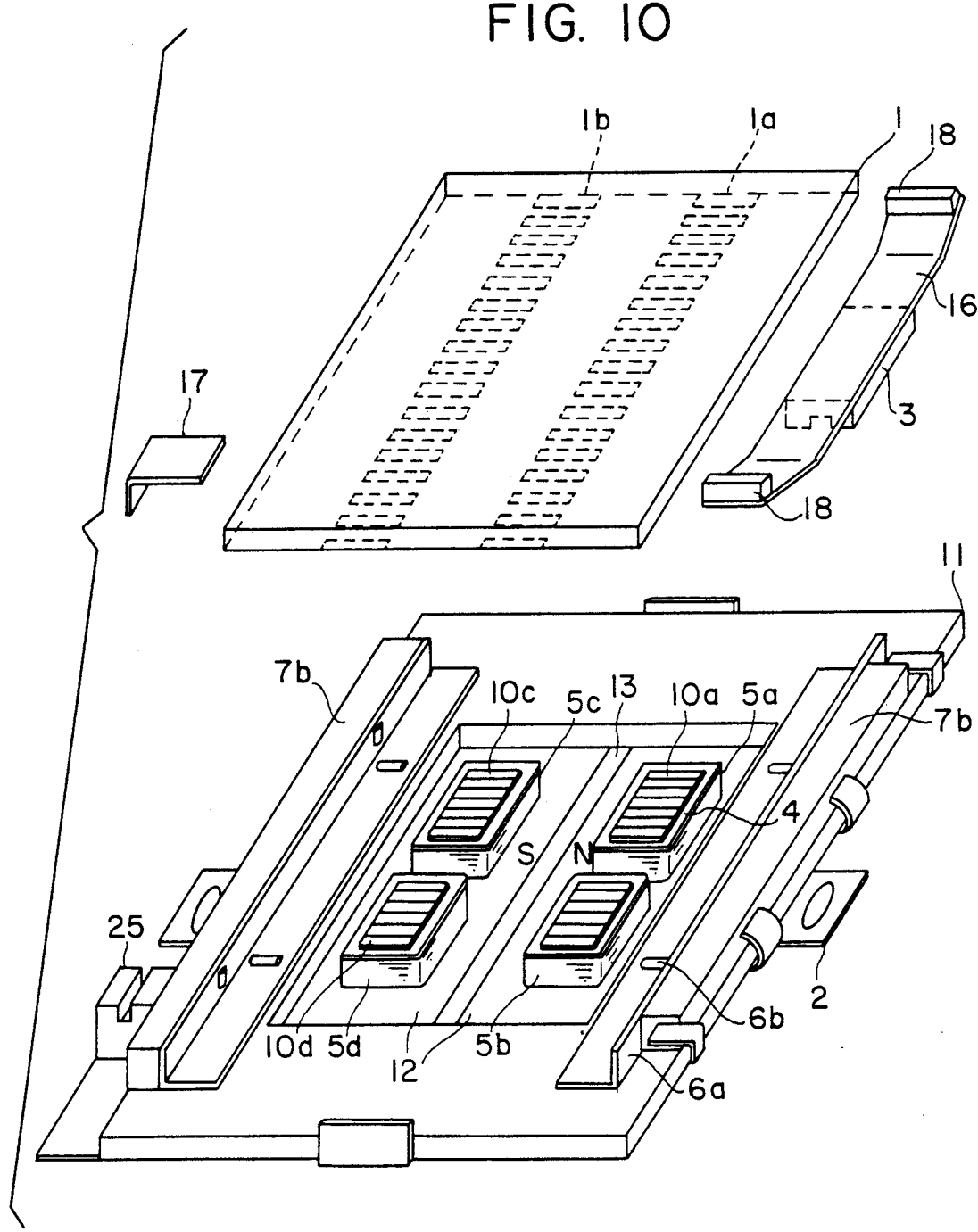
FIG. 10 is a perspective view of a third embodiment of the planar linear pulse motor according to the present invention partly given as an exploded view.
Figure 11:
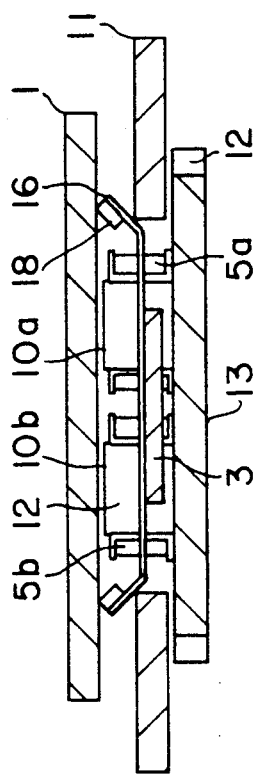
FIG. 11 is a longitudinal sectional view of the third embodiment.

FIGS. 10 and 11 show a third embodiment of the present invention, in which FIG. 10 is a perspective view, and FIG. 11 is a longitudinal sectional view. In this embodiment, the parts corresponding to those of the first and second embodiments are denoted with like numerals. In this embodiment, the lock member 3 made of magnetic material is fixedly secured to the lower surface of a central part of a sheet spring 16 (elastic member), and the two ends of the sheet spring 16 are bent upwards and are provided with pressure rubber pieces 18 on their upper surfaces. This sheet spring 16 is placed in the space between the magnetic pole teeth 10a and 10b, and 10c and 10d in the opening of the base 11 from above. By thus placing the sheet spring 16, the lock member 2 is attracted to the yokes 12 and this causes upward movements of the two ends of the sheet spring until the rubber pressure pieces 18 come into contact with the armature 1. The armature 1 can be fixedly engaged in this way. According to this structure, the lock mechanism including the lock member 3 would not increase the overall height of the motor, and the pressure upon the armature 1 is amplified by the lever action with the base 11 serving as the fulcrum for the sheet spring 16 whose tow arms serve as levers so as to increase the effective force keeping the armature stationary.

Figure 13:
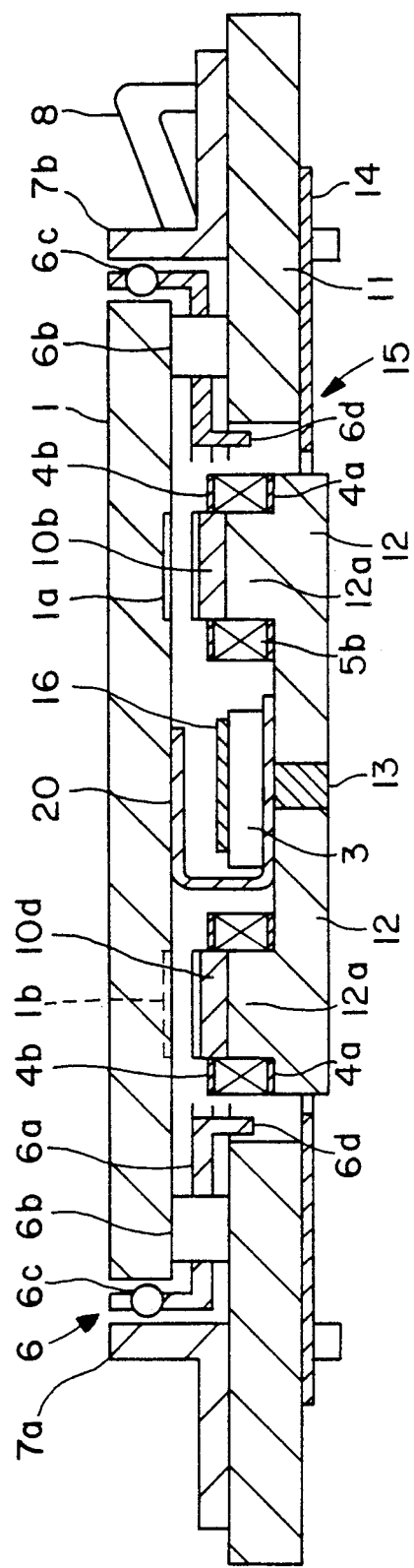
FIG. 13 is a cross-sectional view of the fourth embodiment.
Figure 12:
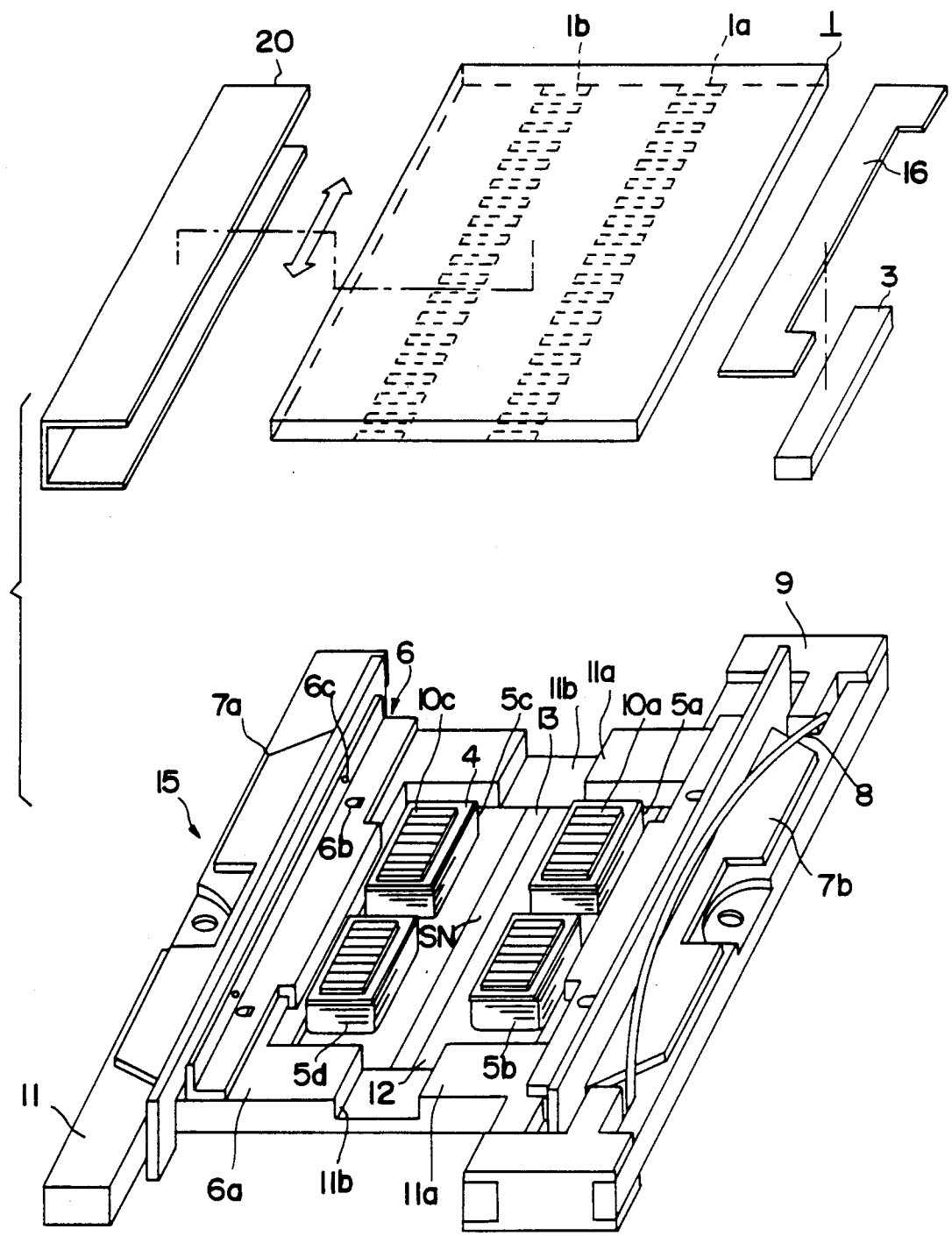
FIG. 12 is a perspective view of a fourth embodiment of the planar linear pulse motor according to the present invention partly given as an exploded view.
Figure 14:
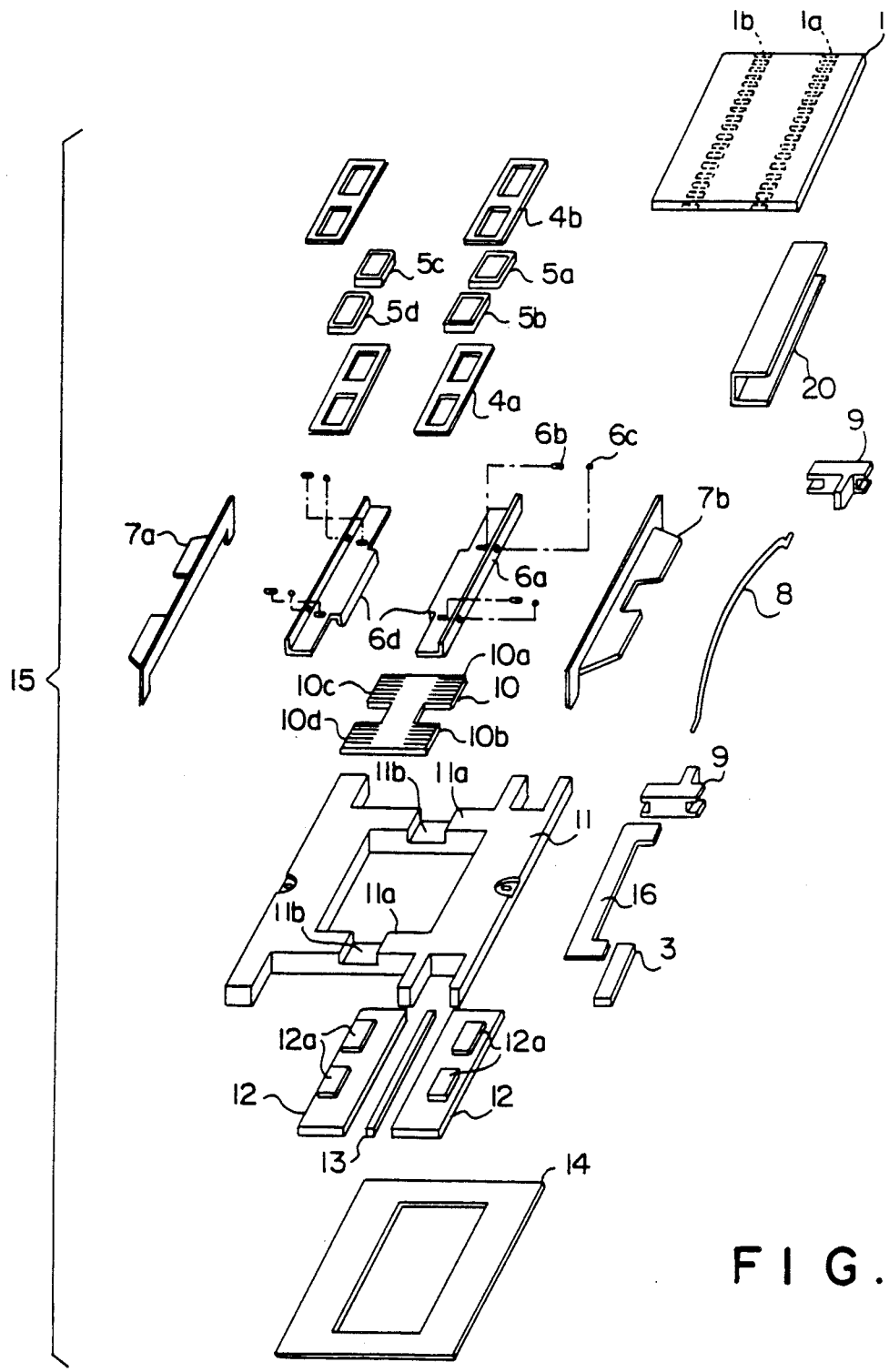
FIG. 14 is an exploded perspective view of the fourth embodiment.

FIGS. 12, 13 and 14 show a fourth embodiment of the present invention. FIG. 12 is a perspective view, FIG. 13 is a cross-sectional view, and FIG. 14 is an exploded perspective view. In this embodiment, the parts corresponding to those of the first, second and third embodiments are denoted with the same numerals.

This embodiment makes use of a pair of separate retainers 6a which are provided with tabs. The armature 1 is received in these retainers 6a, and is slidably supported thereby by way of balls 6c and roller pins 6b. To a central part of the lower surface of the armature 1 is fixedly secured a pressure receiving rail 20 having a rectangular C-shaped cross section and extending along the direction of the movement of the armature 1. The pressure receiving rail 20 thus comprises a depending portion 20a depending perpendicularly from the lower surface of the armature 1 and a lateral extension 20b extending laterally from the lower end of the depending portion 20a. The balls 6c are in contact with the side surfaces of the armature 1 and the guides 7a and 7b, and the roller pins 6b are disposed between the lower surface of the armature 1 and the upper surface of the retainers 6a and is in contact with them. The base 11 is provided with notches 11b at central portions of its front and rear ends for avoiding interference between the pressure rail 20 and the base 11.

The magnetic pole teeth 1a oppose the magnetic pole teeth 10a and 10b, and the magnetic pole teeth 1b oppose the magnetic pole teeth 10c and 10d, defining a certain gap therebetween. The magnetic pole teeth 10a, 10b, 10c and 10d are integrally fabricated as denoted by numeral 10 in FIG. 14, and are cut apart after the entire assembly is fixedly secured to the yokes 12. By doing so, an accurate alignment of the pitch of the magnetic pole teeth can be attained.

A lock member 3 made of magnetic material is fixedly secured to a central part of the lower surface of a sheet spring 16 whose two extreme ends are fixedly secured to a fixing portions 11a provided in central portions of the front and rear ends of the base 11 by suitable fixing means such as screws. The lock member 3 and the sheet spring 16 oppose the yokes 12 (the permanent magnets 13) with the pressure receiving rail 20 being interposed therebetween. Normally, the lock member 3 is attracted to the yokes 12 with the pressure receiving rail 20 interposed therebetween, and the armature 1 is fixedly engaged by fixedly engaging the pressure receiving rail 20 to the stator 15. The lock releasing action is the same as the previous embodiments described above. In other words, when the attractive force of the permanent magnets 13 is released, the lock member 3 moves upwards under the restoring force of the sheet spring 16, and releases the application of pressure to the pressure receiving rail 20.

Figure 15:
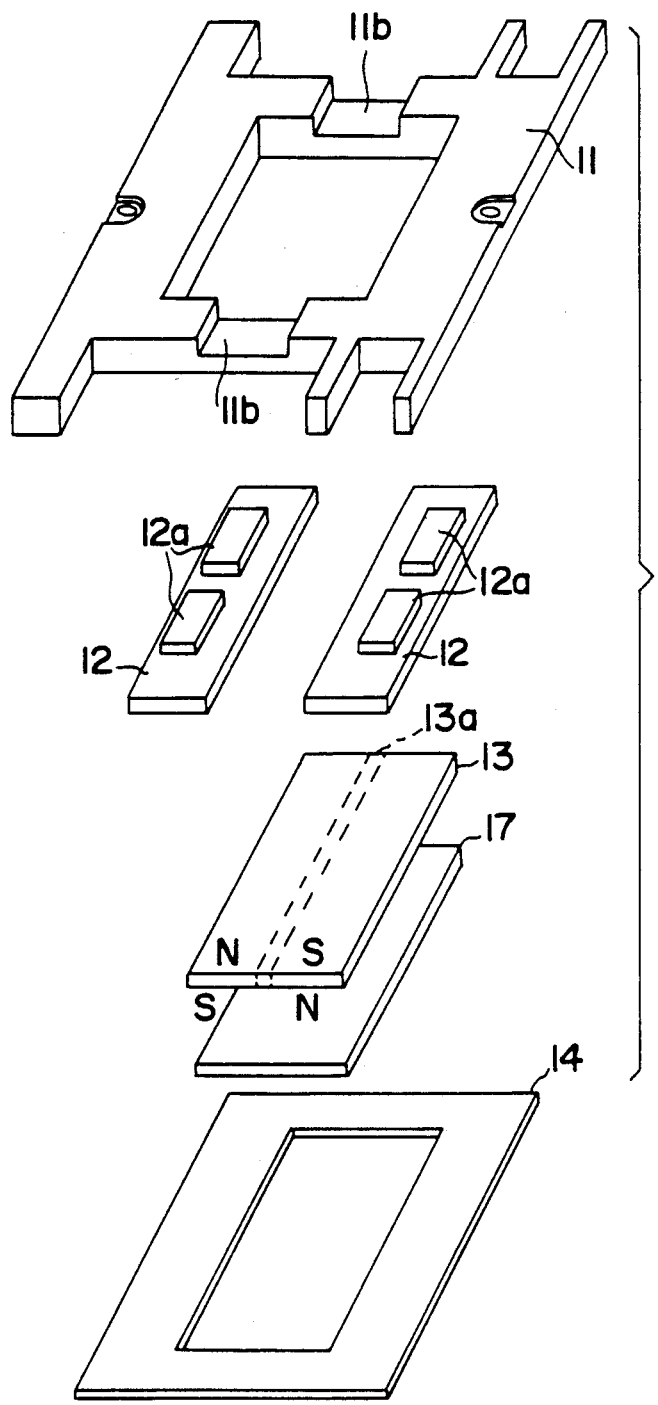
FIG. 15 is an exploded perspective view of a fifth embodiment of the planar linear pulse motor according to the present invention with the armature omitted from the drawing.
Figure 16:
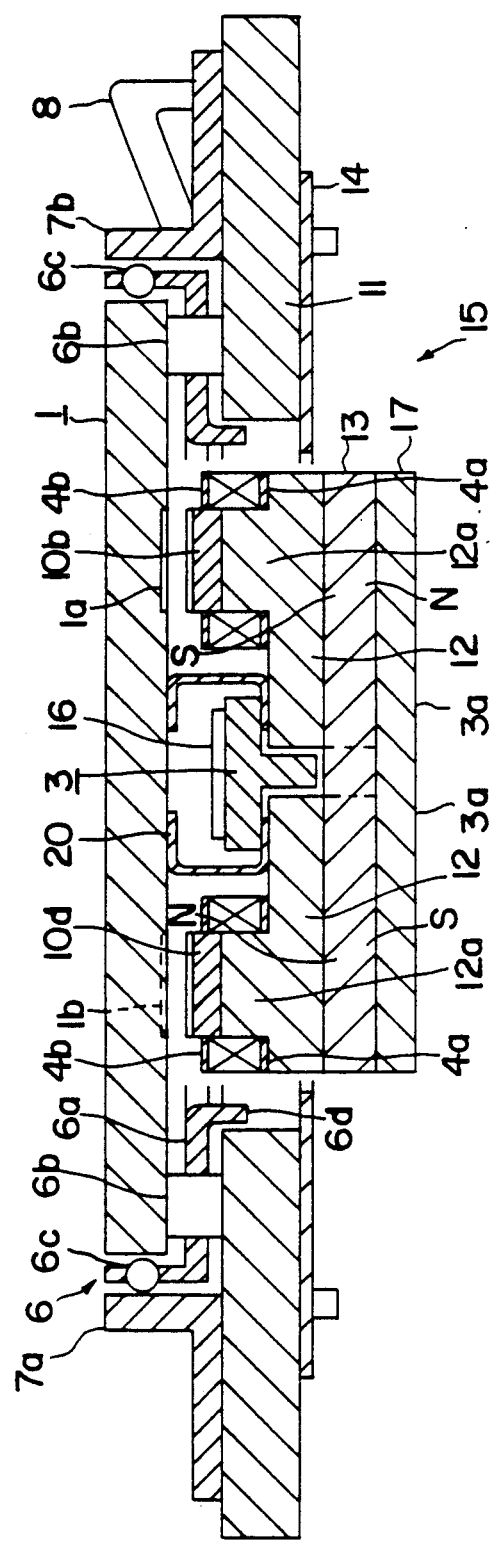
FIG. 16 is a cross-sectional view of the fifth embodiment.

FIGS. 15 and 16 show a fifth embodiment of the planar linear pulse motor according to the present invention. FIG. 15 is an exploded perspective view of only a part of the stator, and FIG. 16 is an overall cross-sectional view. In this embodiment also, the parts corresponding to those of the first embodiment are denoted with like numerals.

This embodiment makes use of a planar permanent magnet 13 having an N pole and an S pole above and below on one side of a central boundary 13a, and an S pole and an N pole above and below on the other side of the central boundary 13a, respectively. The boundary 13a corresponds to the position where the "prismatic permanent magnets 13" were disposed in the previously described embodiments. To define a passage for the magnetic flux produced from this permanent magnet 13, a planar and conformal back yoke 17 is fixedly secured to the lower surface of the permanent magnet 13.

In this embodiment also, a pressure receiving rail 20 is fixedly secured to a central part of the lower surface of the armature 1, and this pressure receiving rail 20 is fixedly engaged by the lock member 3 which is fixedly secured to the sheet spring 16 and attracted to the vicinity of the central portion of the yokes 12. In this case, the pressure receiving rail 20 is constructed as having a pair of depending portions 20a extending parallel to each other, and a pair of lateral extensions 20b extending laterally toward each other from the lower ends of the depending portions defining a gap between the free ends of the lateral extensions 20b.

Figure 17:
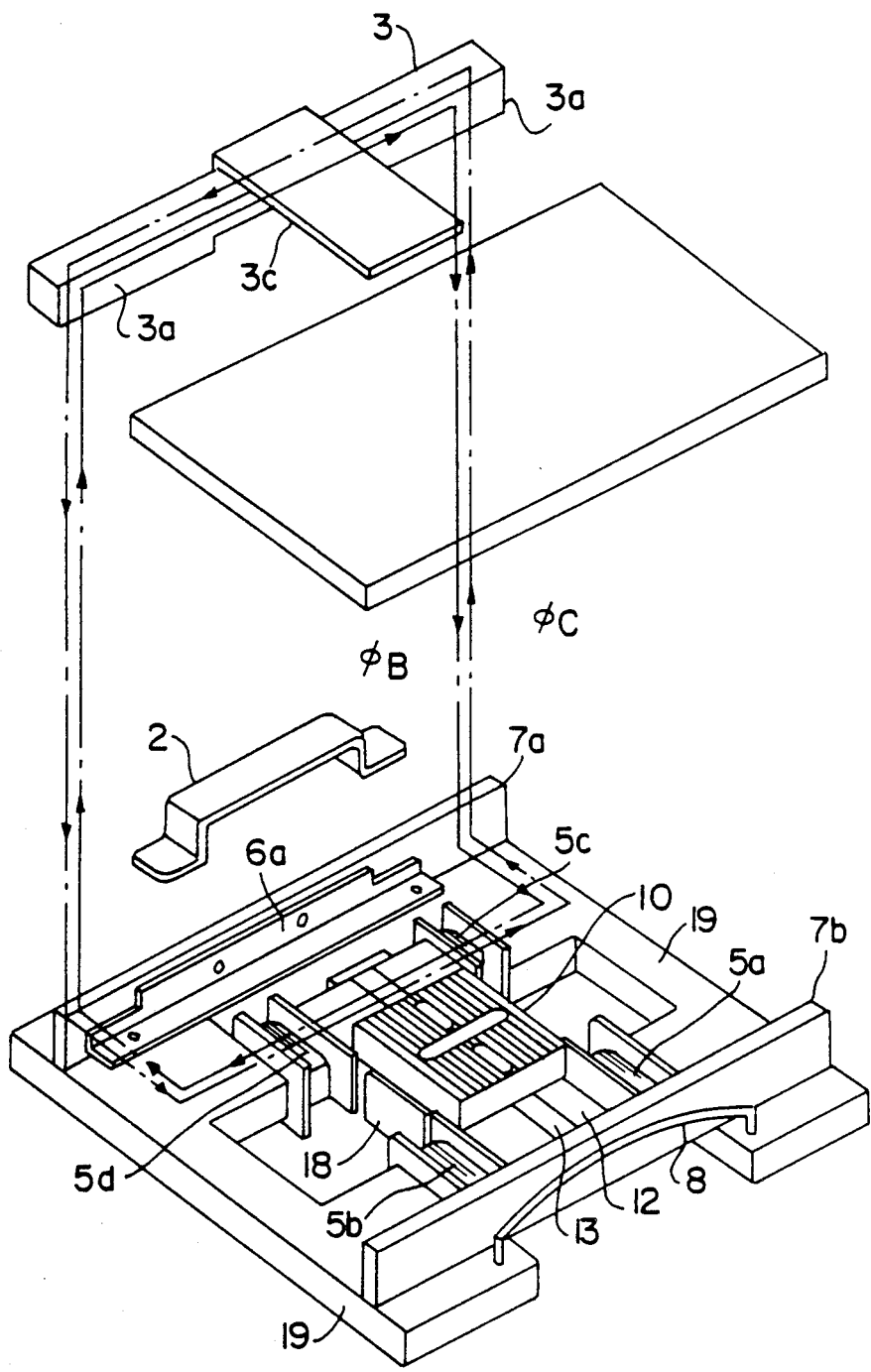
FIG. 17 is a perspective view of a sixth embodiment of the planar linear pulse motor according to the present invention with a part thereof shown as an exploded view.
Figure 18:
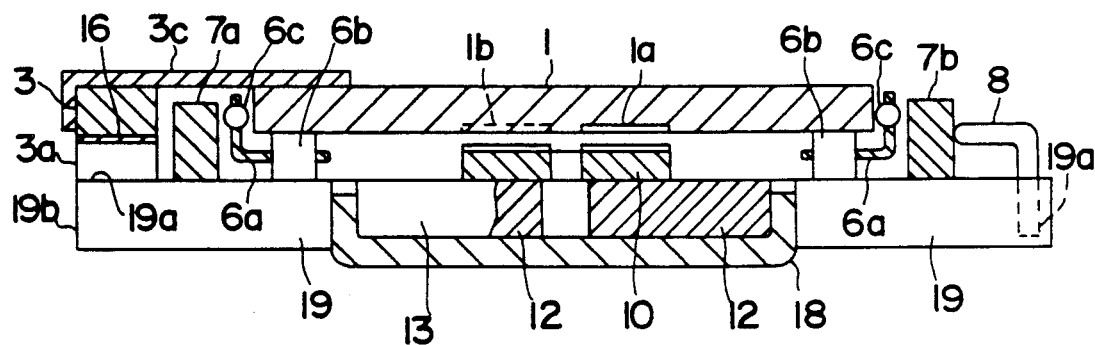
FIG. 18 is a cross-sectional view of sixth embodiment.
Figure 19:
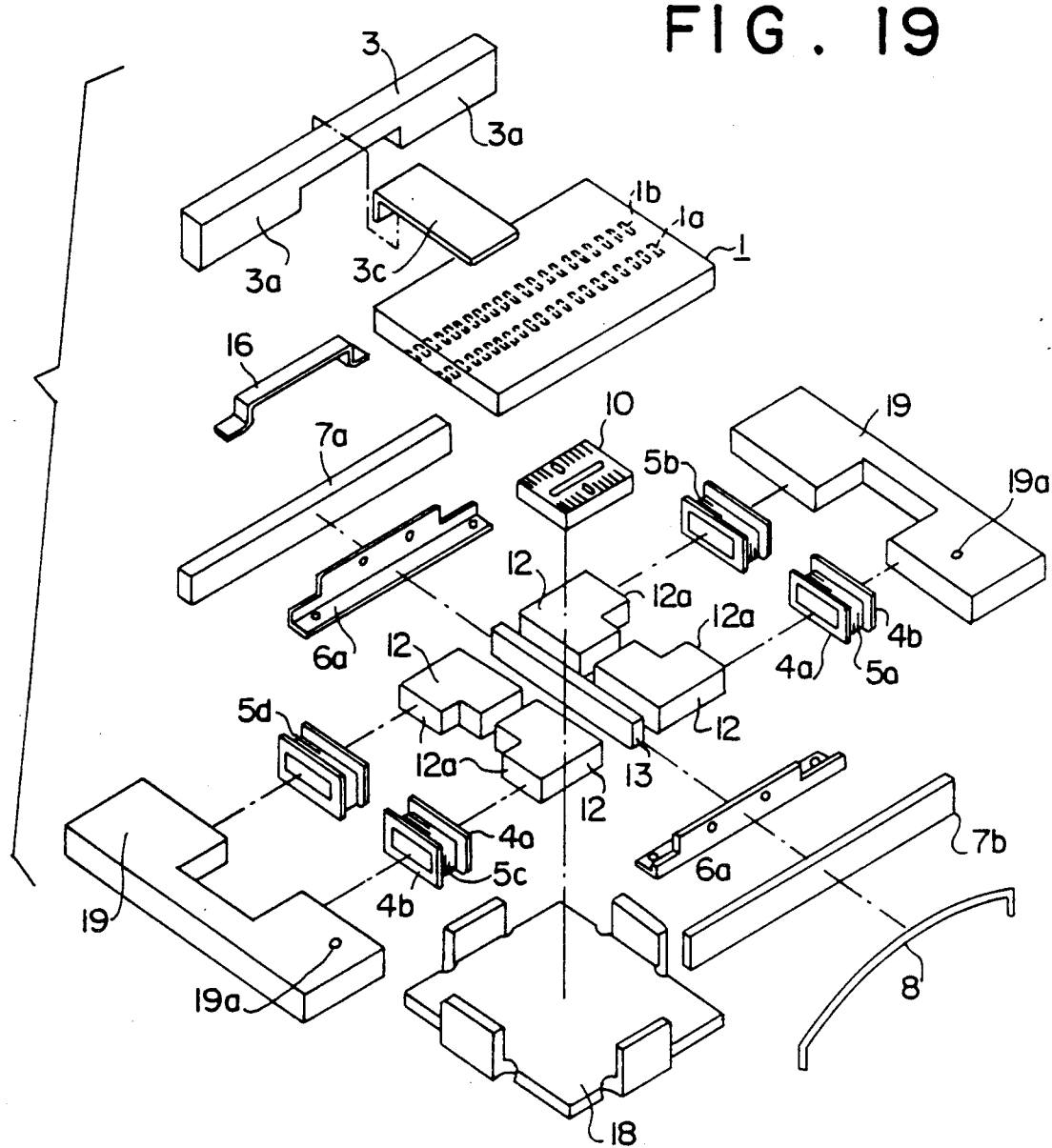
FIG. 19 is an exploded perspective view of the sixth embodiment.
Figure 20:
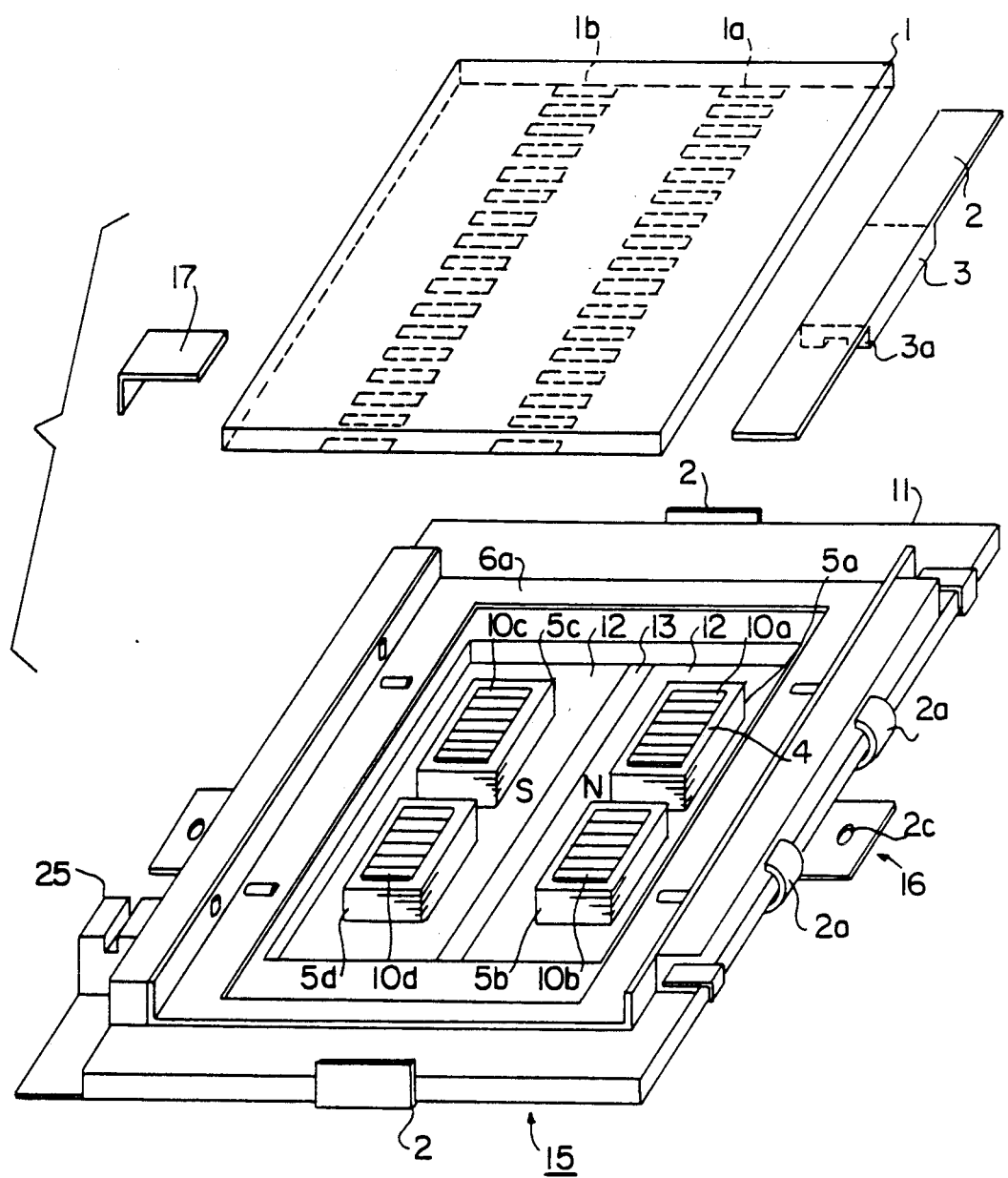
FIG. 20 is a perspective view of a seventh embodiment of the planar linear pulse motor according to the present invention with a part thereof shown as an exploded view.

FIGS. 17, 18 and 19 show a sixth embodiment of the planar linear pulse motor according to the present invention. FIG. 17 is a perspective view of the planar linear pulse motor showing its armature in detached state, FIG. 18 is a cross-sectional view of the same, and FIG. 19 is an exploded perspective view. In this embodiment also, the parts corresponding to those of the first embodiment are denoted with the same numerals.

This embodiment makes use of yokes 12 which are separated into four pieces, each of the yokes 12 is provided with a projection 12a extending in the direction of the movement of the armature 1. Coils 5a through 5d are provided on these projections 12a, and the axial directions of these coils 5a through 5d coincide with the direction of movement of the armature 1. The permanent magnets 13 and the yokes 12, which are integrally joined together, are fixedly secured by a frame 18. The frame 18, the coils 5a and 5d, the front and rear yokes 12, and a reference guide 7a are shown on the left hand side of the drawing as integrally joined together. Another guide 7b is provided on the right hand side so as to be able to move laterally, and the retainer 6a is disposed between these guides 7a and 7b. The retainer 6a supports the armature 1 in a moveable manner. Two ends of a pre-pressure spring 8 are fitted into holes 19a provided in the yokes 19 so as to apply pressure to the guide 7b and one of the retainers 6a. According to this embodiment, since the thickness of the coils does not affect the height of the motor, the advantage of a low-profile design can be obtained.

The lock member 3 is fabricated as a rod which is bridged across the front and rear yokes 12 defining a small gap with respect to the yokes 12. The front and rear yokes 19 oppose the leg portions 3a. A pressure member 3c for applying pressure to the armature 1 is provided in a central part of the upper surface of the lock member 3 so as to project toward a central part of the motor. This lock member 3 is mounted on a central part of the upper surface of a sheet spring 2 which is fixedly secured to a side end of yoke bases 19. As the leg portions 3a of the lock member 3 are attracted to the side portions 19a of the front and rear yoke bases 19, the pressure member 3c presses upon the armature, and fixedly engages with 14. In this embodiment also, the direction of the magnetic flux $\Phi_c$ passing through the lock member 3 produced by the coils 5a through 5d is opposite to the direction of the magnetic flux $\Phi_B$ produced by the permanent magnet 13, as shown in FIG. 17. It is also possible to provide a pair of lock members on either side of the yoke bases 19.

Thus, according to the planar linear pulse motor of the present invention, the stator is securely engaged when no electric current is supplied to the drive coils by means of a lock member provided in the stator which is attracted to a permanent magnet by its biasing magnetic flux. Therefore, the armature can be locked up without consuming any electric power. Thus, there is provided a linear pulse motor which consumes little electric power and is highly resistant to impact, vibration and other external forces. When this linear pulse motor is applied to the drive for a magnetic head, proper action of the head is ensured, and the possibility of damaging the motor or the head due to inadvertent external forces can be eliminated.

Further, by providing the lock member on the stator, the mass of the armature is not increased, and the responsiveness of the armature is not impaired.

In the planar linear pulse motor of the present invention, a lock member consisting of a magnetic member is supported on the armature by way of an elastic member whose two extreme ends are fixedly secured to the armature. When the drive coils are not energized, the lock member is attracted to the permanent magnets or the yokes to fixedly engage the armature to the stator by a magnetic attractive force. Since this attractive force is produced by the permanent magnet, no electric power is consumed. When the motor is activated and electric current is supplied to the drive coils, the resulting magnetic flux passes through the lock member and cancels the magnetic flux which was the cause of the attractive force so that the attractive force is lost and the armature can move freely. The motor otherwise operates in the same way as a conventional planar linear pulse motor in that the drive coils are sequentially energized to move the armature by the increment of P/4.

Figure 25:
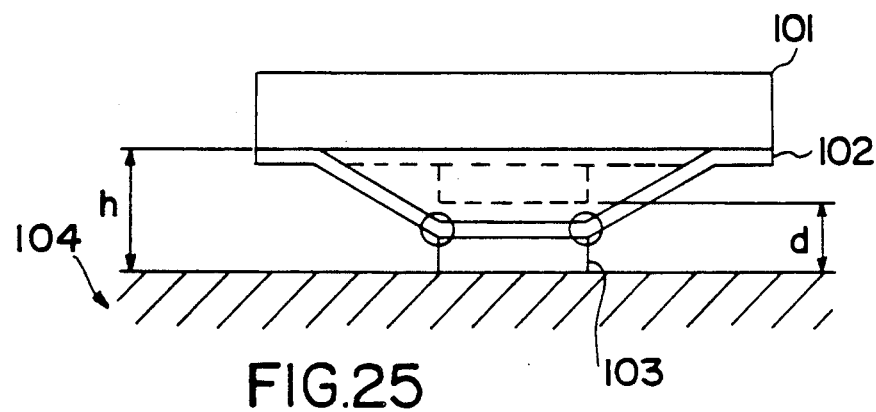
FIGS. 25 and 26 are schematic views for explaining the advantage of one of the features of the present invention.
Figure 26:
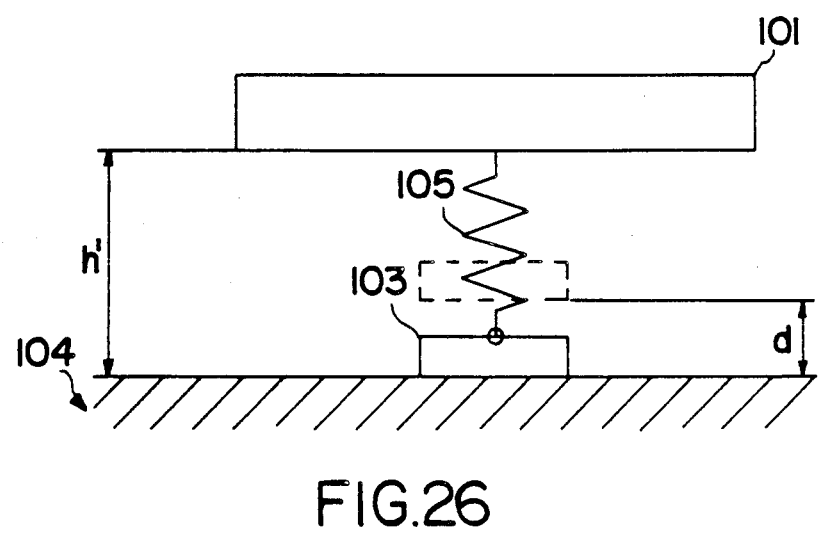

The action resulting from fixedly securing the two extreme ends of the elastic member is described in the following with reference to FIGS. 25 and 26. FIG. 25 shows an example in which the two extreme ends of an elastic member are fixedly secured according to the present invention, and FIG. 26 shows a case in which only one end of an elastic member (a coil spring) is fixedly secured. In FIGS. 25 and 26, numerals 101, 102, 103, 104 and 105 denote armatures, an elastic member, lock members, permanent magnets (yokes) and a coil spring, respectively. The solid lines show the state in which the lock member is attracted to the permanent magnet 104 by its biasing magnetic flux. This attractive force fixedly engages the armature 101 and the stator (permanent magnets 104) to each other, and restricts their relative movement. When this attractive force is removed by energizing the drive coils, they move away from each other by a small distance d. This small distance d is so selected as to allow the movement of the armature and to permit the lock member 3 to be attracted back to the armature again when required. The gap between the armature 101 and the permanent magnet 104 required to ensure this distance d is h. On the other hand, when a coil spring 105 is used, the corresponding gap h' is larger than the gap h because of the height of the coil spring 105 itself, and this causes an increase in the vertical dimension. Furthermore, the elastic member 102 can achieve a stable locking state since it is secured to the armature at its two ends whereas the coil spring 105 can lock up only one point of the armature 102 and its locking action is therefore unstable.

Figure 21:
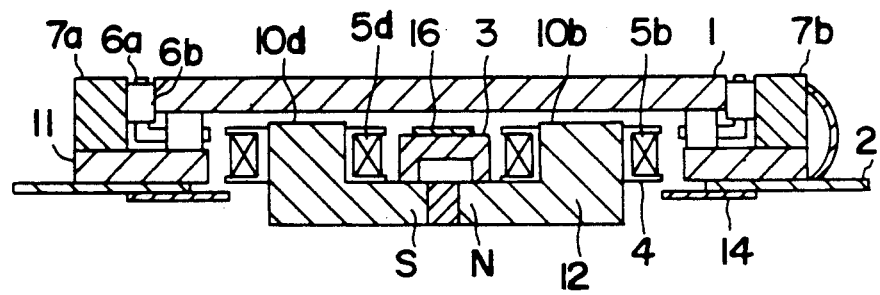
FIG. 21 is a cross-sectional view of the seventh embodiment.
Figure 22:
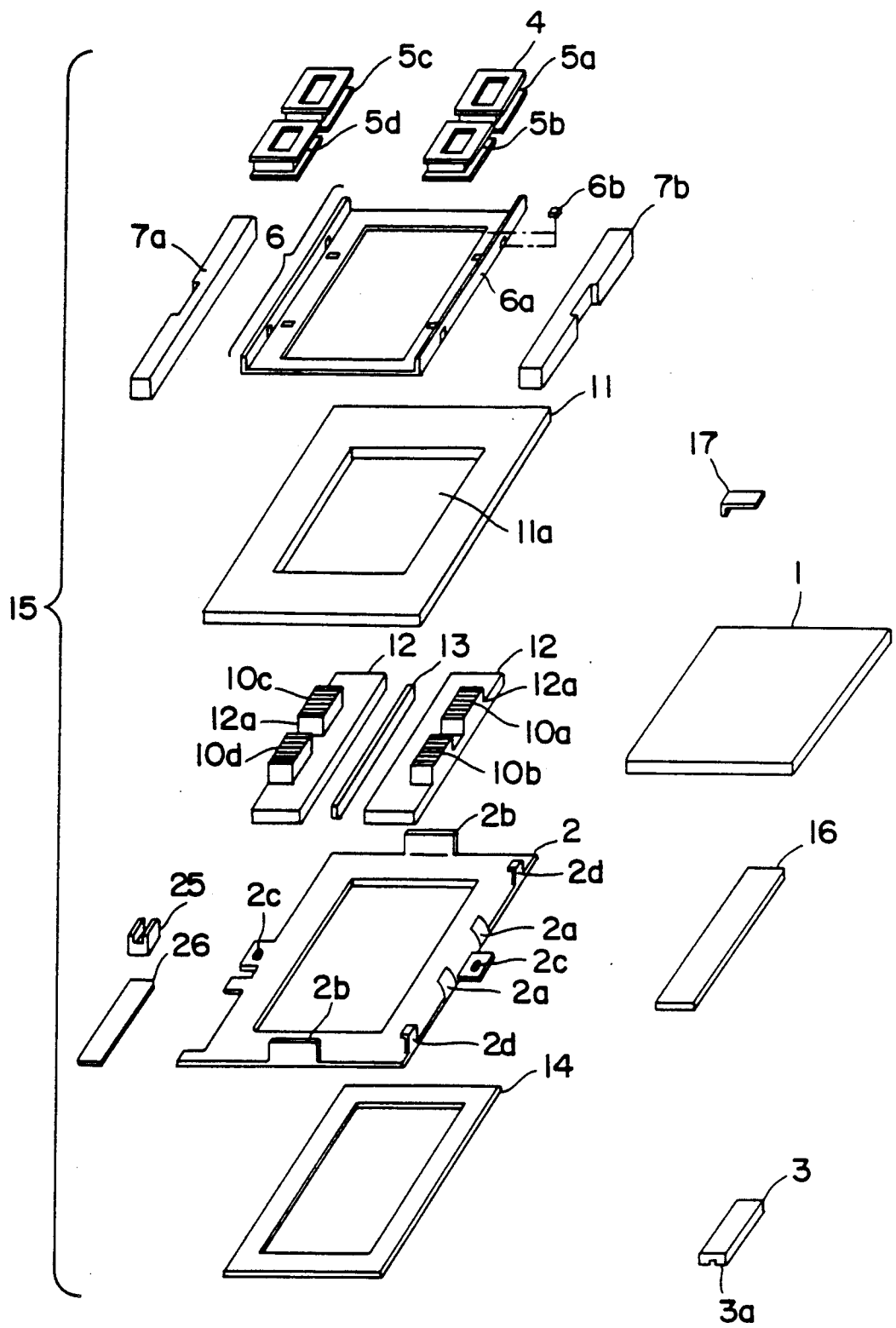
FIG. 22 is an exploded perspective view of the seventh embodiment.
Figure 23:
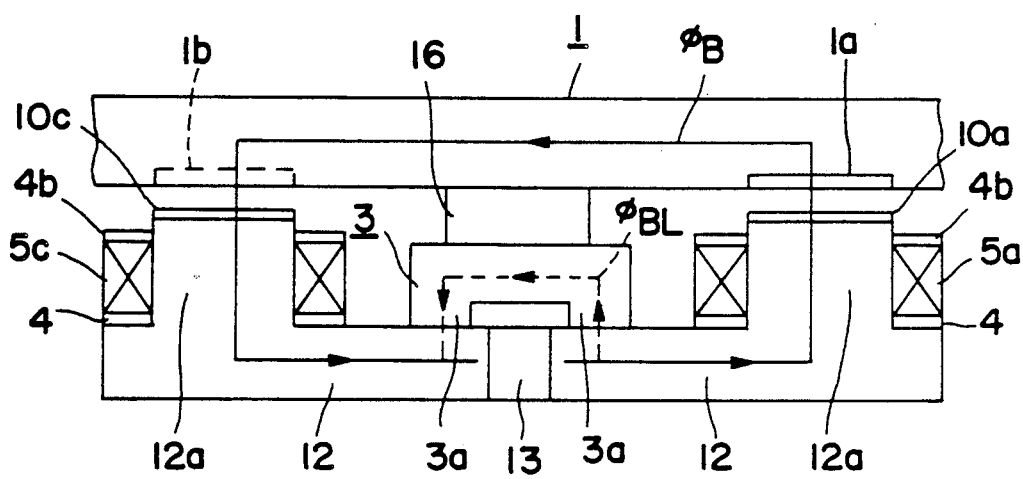
FIGS. 23 and 24 are schematic side views for explaining a basic principle of the present invention.

FIGS. 21 through 23 are drawings illustrating a seventh embodiment of the planar linear pulse motor according to the present invention. FIG. 21 is a perspective view of the planar linear pulse motor; FIG. 22 is a cross sectional view of the planar linear pulse motor in its assembled state; and FIG. 23 is an exploded perspective view of the planar linear pulse motor.

This planar linear pulse motor comprises a stator 15 and an armature 1. The stator 15 comprises a base 11. A central part of the base 11 is provided with a rectangular opening 11a. The two side portions of the upper surface of the base 11 serves as roller guide surfaces (rail surfaces), and the rectangular central opening 11a accommodates various component parts therein. The accommodated component parts are fixedly secured to a pre-pressure frame 2 (which is described hereinafter).

The rectangular opening 11a of the base 11 receives a pair of yokes 12 made of magnetic material and a permanent magnet 13. The laterally arranged pair of yokes 12 have the prismatic permanent magnet 13 interposed therebetween, and they are integrally attached not only to one another but also to the front and rear fringes of the lower surface of the base 11 adjoining the rectangular opening 11a. Gaps are defined between the yokes 12 and the lateral ends of the rectangular opening 11a. Each of the yokes 12 is provided with a pair of coil cores 12a integrally projecting therefrom, and magnetic pole teeth 10a, 10b, 10c and 10d are formed on the upper surfaces of the coil cores 12a either by etching or by machining. The permanent magnet 13 is provided with N and S poles on its side surfaces adjoining the different yokes 12.

The magnetic pole teeth 10a through 10d are formed as ridges and grooves of rectangular cross-section which alternate at a fixed pitch P in the same way as in the previously described embodiments. The four coil cores 12a or the magnetic pole teeth 10a through 10d are provided with drive coils 5a, 5b, 5c and 5c wound around spools 4 fitted thereon.

To the lower surface of the base 11 is secured a pre-pressure spring frame 2 which is substantially conformal (annular frame) to the base 11 and is provided with various tab pieces along its periphery. The pre-pressure spring frame 2 serves both as a motor mount and a member for preventing the armature from coming off. Specifically, tabs 2b at its front and rear ends and the tabs 2d at its side ends constrain the horizontal movement of the armature 1 (play control), and mounting holes 2c permit it to be mounted on a main frame (such as a floppy disk drive). Pre-pressure springs 2a formed as curved tabs urge a pre-pressure guide 7b (which is described hereinafter) inwardly. To the lower surface of the pre-pressure spring frame 2 is fixedly secured a circuit board 14 for the drive coils 5a through 5d. The circuit board 14 is also provided with a rectangular annular shape in the same way as the base 11. To the upper surface of the pre-pressure spring frame 2 are fixedly secured a sensor 25 for detecting the reference position of the motor and a circuit board 26 for this sensor.

To one side of the base 11 is fixedly secured a travel reference guide 7a by screws or with a bonding agent. The inner side surface of this guide 7a defines an exact right angle with respect to the direction in which the rectangular ridges (grooves) of the magnetic pole teeth 10a through 10d extend. On the other side of the base 11 is disposed a pre-pressure guide 7b in a slightly laterally moveable manner. The pre-pressure springs 2a provided as tabs extending from the peripheral edges of the pre-pressure spring frame 2 urge the pre-pressure guide 7b inwardly.

A travel support mechanism 6 for the armature 1 is provided between the guide 7a and the pre-pressure guide 7b, and this mechanism comprises a retainer 6a. This retainer 6a is rectangular in shape and is provided with vertical portions on either side end thereof, as well as a rectangular central opening conformal to the base 11. The side fringes and the vertical portions of the retainer 6a are provided with a plurality of small openings for rotatably receiving roller pins 6b therein.

The armature 1 consists of a planar magnetic member, and its lower surface is provided with two rows of magnetic pole teeth 1a and 1b. The magnetic pole teeth 1a and 1b also consist of a plurality of alternating ridges and grooves of rectangular cross-section, and their pitch and phase relationship are the same as those of the magnetic pole teeth 10a through 10d. The magnetic pole teeth 1a and 1b are provided with a relative phase shift of P/4. A light shield 17 is attached to the upper surface of the armature 1 to detect the position of the armature 1 by shielding light from the sensor 25 for detecting the reference position of the motor. This armature 1 is received in the retainer 6a, and is supported by the roller pins 6b in a freely slidable manner. The vertical roller pins 6b contact the side surfaces of the armature 1 and the guides 7a and 7b, while the horizontal roller pins 6b are interposed between the lower surface of the armature 1 and the upper surface of the base 11 and are in contact with them. The magnetic pole teeth 1a of the armature 1 oppose the magnetic pole teeth 10a and 10b, and the magnetic pole teeth 1b oppose the magnetic pole teeth 10c and 10d, defining a certain gap therebetween in each case.

The lock member 3 consists of an elongated rectangular block member made of magnetic material, and is provided with a pair of leg portions 3a extending from the lower surface thereof at either side end thereof. The spacing between the two leg portions 3a is selected so as to cause them to straddle the permanent magnet 13. The upper surface of the lock member 3 is integrally attached, at its upper surface, to the lower surface of a central part of a strip of sheet spring 16. This sheet spring 16 is fixedly secured to the central parts of the longitudinal ends of the armature 1 by such fixing means as screws. As described hereinafter, the lock member 3 is attracted to the permanent magnet 13 against the elastic force of the sheet spring 16, and its leg portions 3a abuts the yoke 12 on either side of the permanent magnet 13.

This planar linear pulse motor described above operates as a motor in the same way as the previously described embodiments.

When electric current is supplied to none of the drive coils, the stator 1 reaches a stable position and is retained at this position by the attractive force acting between the magnetic pole teeth 1a, 1b and 10a through 10d and produced by the permanent magnet 13. The force acting on the armature is the cogging force.

Figure 24:
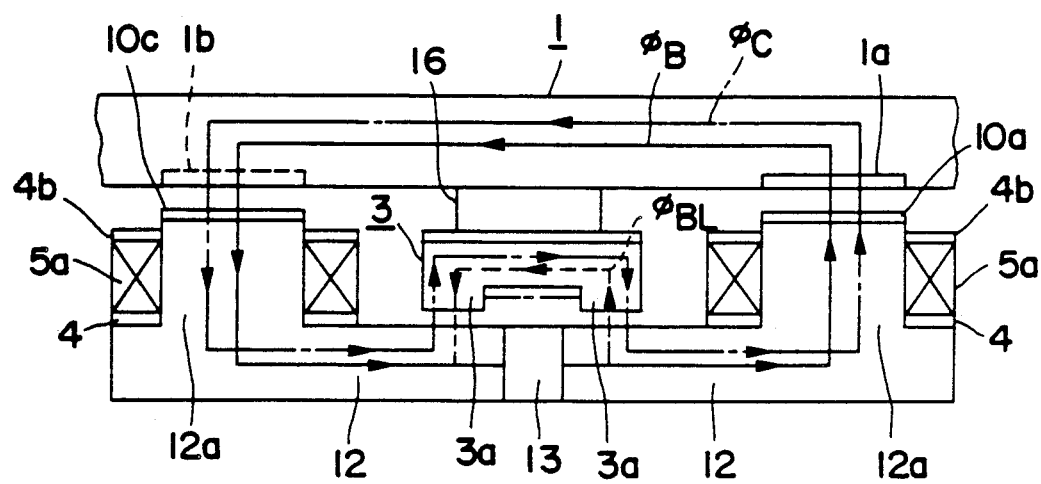

Now the locking action of the lock member 3 is described. FIG. 23 shows the state in which the armature 1 is locked up, and FIG. 24 shows the state in which the armature 1 is permitted to move as described above. These drawings are enlarged views of a part of FIG. 21, but are given as views of a different cross-section from that of FIG. 21. In other words, for convenience of description, the drive coils 5a and 5c are illustrated instead of the drive coils 5b and 5d, and the magnetic pole teeth 10a and 10c are illustrated instead of the magnetic pole teeth 10c and 10d.

Referring to FIG. 23, when electric current is supplied to none of the drive coils 5a through 5d, the biasing magnetic flux $\Phi_B$ of the permanent magnet 13 forms a closed loop passing through the yoke 12, the magnetic pole teeth 10a and 10b, the magnetic pole teeth 1a, the armature 1, the magnetic pole teeth 1b, the magnetic pole teeth 10c and finally back to 10d, and the yoke 12. This produces magnetic poles in the magnetic pole teeth and hence the cogging force. A leak magnetic flux $\Phi_{BL}$ of the biasing magnetic flux $\Phi_B$ passes through the lock member 3, and attracts the lock member 3 toward the parts of the yokes 12 located on either side of the permanent magnet 13 against the restoring force of the sheet spring 16. As there is no electric current involved, the armature may be fixedly engaged without consuming any electric power.

Now is described how the armature 1 is moved with reference to FIG. 24. When electric current is supplied to the drive coil 5a to produce a magnetic flux $\Phi_C$ directed in the same direction as the biasing magnetic flux $\Phi_B$ in the main magnetic circuit of the motor, this magnetic flux passes through the magnetic pole teeth 10a, the magnetic pole teeth 1a, the armature 1, the magnetic pole teeth 1b, the magnetic pole teeth 10c, the yoke 12, the lock member 3, and the yoke 12. Since this magnetic flux in the lock member 3 is opposite in direction to the leak magnetic flux $\Phi_{BL}$ produced from the permanent magnet 13, the attractive force acting on the lock member 3 is sufficiently weakened for the lock member 3 to be moved away from the yokes 12 under the restoring force of the sheet spring 16, and the locking action is removed. The movement of the armature by P/4 by supplying electric current to the drive coil 5a occurs in the same way as described above.

This action takes place in the same way also when electric current is supplied to the drive coils 5b, 5c and 5d.

Thus, according to the planar linear pulse motor of the present invention, the stator is securely engaged when no electric current is supplied to the drive coils by means of a lock member provided in the armature which is attracted to a permanent magnet by its biasing magnetic flux. Therefore, the armature can be locked up without consuming any electric power. Further, by attaching the lock member to the armature by way of an elastic member whose two ends are fixedly secured to the armature, not only the vertical dimension required for the elastic member can be reduced but also the mechanical strength and the security of engagement can be ensured, thereby offering a planar linear pulse motor which is compact and highly reliable.

Although the present invention has been shown and described with respect to detailed embodiments, it should be understood by those skilled in the art that various changes and omission in form and detail may be made therein without departing from the spirit or scope of this invention.

What we claim is:

1. A planar linear pulse motor, comprising:
  a stator having a yoke provided with magnetic pole pieces defining a plurality of magnetic pole teeth;
  an armature having a plurality of magnetic pole teeth opposing said magnetic pole teeth of said stator and slidably supported by said stator;
  a plurality of drive coils provided in the associated magnetic pole pieces of said stator yoke so as to be sequentially energized to produce a magnetic flux for moving said armature relative to said stator;
  a permanent magnet provided in said stator to form a closed loop of a biasing magnetic flux passing through said magnetic pole teeth of said stator and said magnetic pole teeth of said armature; and
  a lock member consisting of a magnetic member supported by said armature by way of a spring member to urge said lock member against said stator;
  said permanent magnet being disposed in a part of said stator in such a manner that said biasing magnetic flux produced from said permanent magnet urges said lock member toward said stator and against the biasing force of said spring member to restrict movement of said armature relative to said stator when said drive coils are not energized, and releases said lock member away from said stator under the biasing force of said spring member to permit movement of said armature relative to said stator when said drive coils are energized with a part of a magnetic flux produced from said drive coils canceling in said lock member said biasing magnetic flux produced from said permanent magnet.

2. A planar linear pulse motor, comprising:
a stator having a yoke provided with magnetic pole pieces defining a plurality of magnetic pole teeth;
an armature having a plurality of magnetic pole teeth opposing said magnetic pole teeth of said stator and slidably supported by said stator;
a plurality of drive coils provided in the associated magnetic pole pieces of said stator yoke so as to be sequentially energized to produce a magnetic flux for moving said armature relative to said stator;
a permanent magnet provided in said stator to form a closed loop of a biasing magnetic flux passing through said magnetic pole teeth of said stator and said magnetic pole teeth of said armature; and
a lock member consisting of a magnetic member supported by said stator by way of a spring member to urge said lock member against said armature;
said permanent magnet being disposed in a part of said stator in such a manner that said biasing magnetic flux produced from said permanent magnet urges said lock member toward said armature and against the biasing force of said spring member to restrict movement of said armature relative to said stator when said drive coils are not energized, and releases said lock member away from said armature under the biasing force of said spring member to permit movement of said armature relative to said stator when said drive coils are energized with a part of a magnetic flux produced from said drive coils canceling in said lock member said biasing magnetic flux produced from said permanent magnet. are energized with a part of a magnetic flux produced from said drive coils canceling in said lock member said biasing magnetic flux produced from said permanent magnet.

3. A planar linear pulse motor according to claim 2, wherein said lock member is supported by said stator by way of said spring member.

4. A planar linear pulse motor according to claim 3, wherein said permanent magnet is disposed adjacent to said yoke defining an opening therebetween, and said lock member is disposed adjacent an end of said opening remote from said armature, said lock member being provided with a projection which is passed through said opening so as to come into contact with a part of said armature when said lock member is actuated by said biasing magnetic flux of said permanent magnet.

5. A planar linear pulse motor according to claim 4, wherein said spring member consists of a sheet spring carrying said lock member in a central part thereof and fixedly secured to said stator at two ends thereof.

6. A planar linear pulse motor according to claim 3, wherein said armature is provided with a frictional rail element extending along the direction of movement of said armature and comprising a depending portion depending from said armature and a lateral extension extending laterally from a lower end of said depending portion, and said lock member is disposed above said lateral extension so as to be pressed upon said lateral extension when actuated by said biasing magnetic flux of said permanent magnet.

7. A planar linear pulse motor according to claim 3, wherein said armature is provided with a frictional rail element extending along the direction of movement of said armature and comprising a pair of depending portions depending from said armature in a parallel relationship and a pair of lateral extensions extending laterally toward each other from the lower ends of associated ones of said depending portions so as to define a gap between mutually opposing ends of said lateral extensions, and said lock member comprises a part which is disposed above said lateral extensions so as to be pressed upon said lateral extensions when actuated by said biasing magnetic flux of said permanent magnet.

8. A planar linear pulse motor according to claim 3, wherein said lock member is provided with a lateral arm which is adapted to be engaged with said armature when said lock member is actuated by said biasing magnetic flux of said permanent magnet.

9. A planar linear pulse motor according to claim 1, wherein said lock member is supported by said armature by way of said spring member.

10. A planar linear pulse motor according to claim 9, wherein said spring member consists of a sheet spring carrying said lock member in a central part thereof and fixedly secured to said stator at two ends thereof.

11. A planar linear pulse motor according to claim 4, wherein said projection and said armature are provided with irregular surfaces at their mutually cooperating surfaces.

12. A planar linear pulse motor, comprising:
a stator having a yoke provided with magnetic pole pieces defining a plurality of magnetic pole teeth;
an armature having a plurality of magnetic pole teeth opposing said magnetic pole teeth of said stator and slidably supported by said stator;
a plurality of drive coils provided in the associated magnetic pole pieces of said stator yoke so as to be sequentially energized to produce a magnetic flux for moving said armature relative to said stator;
a permanent magnet provided in said stator to form a closed loop of a biasing magnetic flux passing through said magnetic pole teeth of said stator and said magnetic pole teeth of said armature; and
a lock member consisting of a magnetic member supported by said stator by way of a sheet spring member, said spring member comprising a central part carrying said lock member, a pair of intermediate parts on either side of said central part supported by parts of said stator in the manner of fulcrums, and free ends extending beyond said intermediate parts and carrying frictional members;
said permanent magnet being disposed in a part of said stator in such a manner that said biasing magnetic flux produced from said permanent magnet urges said lock member toward said stator against the biasing force of said spring member so as to frictionally engage said armature with said frictional members to restrict movement of said armature relative to said stator when said drive coils are not energized, and releases said lock member away from said stator under the biasing force of said sheet spring member so as to move said frictional members away from said armature to permit movement of said armature relative to said stator when said drive coils are energized with a part of a magnetic flux produced from said drive coils canceling in said lock member said biasing magnetic flux produced from said permanent magnet.

* * * * *